United States Patent
Tanaka et al.

(10) Patent No.: US 7,932,944 B2
(45) Date of Patent: Apr. 26, 2011

(54) PIXEL MIXTURE METHOD

(75) Inventors: Masayuki Tanaka, Tokyo (JP);
Masatoshi Okutomi, Tokyo (JP)

(73) Assignee: Tokyo Institute of Technology,
Meguro-ku, Tokyo (JP)

( * ) Notice: Subject to any disclaimer, the term of this patent is extended or adjusted under 35 U.S.C. 154(b) by 512 days.

(21) Appl. No.: 11/994,566

(22) PCT Filed: Jun. 1, 2006

(86) PCT No.: PCT/JP2006/311456
§ 371 (c)(1),
(2), (4) Date: Feb. 4, 2008

(87) PCT Pub. No.: WO2007/004386
PCT Pub. Date: Jan. 11, 2007

(65) Prior Publication Data
US 2009/0027531 A1    Jan. 29, 2009

(30) Foreign Application Priority Data
Jul. 5, 2005    (JP) .............................. 2005-196157

(51) Int. Cl.
*H04N 9/083* (2006.01)
(52) U.S. Cl. .................. 348/280; 348/273; 382/162
(58) Field of Classification Search .......... 348/266–283;
382/162–167
See application file for complete search history.

(56) References Cited

U.S. PATENT DOCUMENTS

| 5,880,781 | A  | * | 3/1999  | Udagawa et al. | 348/279 |
| 6,816,193 | B1 | * | 11/2004 | Kohashi et al. | 348/234 |

FOREIGN PATENT DOCUMENTS

| JP | 2003-087804 | 3/2003  |
| JP | 2003-116061 | 4/2003  |
| JP | 2003-319407 | 11/2003 |
| JP | 2004-112768 | 4/2004  |
| JP | 2005-109968 | 4/2005  |
| JP | 2005-236975 | 9/2005  |

OTHER PUBLICATIONS

Ikuko Tsubaki et al., "Diagonal Pixel Mixture for CCD Image Sensors" The Journal of The Institute of Image Information and Television Engineers, vol. 58, No. 3, pp. 392-395, 2004, English Outline.

* cited by examiner

*Primary Examiner* — Sinh Tran
*Assistant Examiner* — Anthony J Daniels
(74) *Attorney, Agent, or Firm* — Nixon Peabody LLP; Jeffrey L. Costellia

(57) ABSTRACT

The pixel mixture method of the present invention for mixing several pixels on a solid-state image sensing device, which is applied to an imaging device having the solid-state image sensing device with a color filter array (CFA) and multiple pixels, comprising: a pixel mixture operating step for performing a pixel mixture operation based on a pixel mixture operation equation for the several pixels that are adjacent spatially; a color conversion matrix generating step for generating a color conversion matrix based on the kind of colors of a color space after mixture and the pixel mixture operation equation; and a desired color space converting step for converting the color space after mixture into a desired color space based on the generated color conversion matrix.

12 Claims, 8 Drawing Sheets

FIG.8

CONVENTIONAL SAME-COLOR-PIXEL MIXTURE
(PIXEL POSITION AFTER MIXTURE IS
UNEQUALLY-SPACED)

PSNR: 20.54 [dB]
(A)

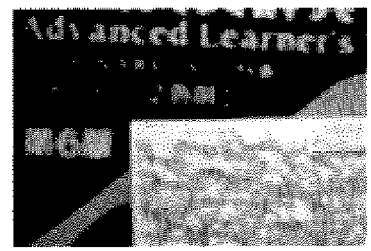

CONVENTIONAL SAME-COLOR-PIXEL MIXTURE
(PIXEL POSITION AFTER MIXTURE IS
EQUALLY-SPACED)

PSNR: 21.74 [dB]
(B)

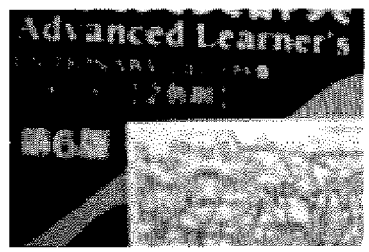

NINE-PIXEL MIXTURE OF THREE-COLOR
SYSTEM AFTER MIXTURE ACCORDING TO
THE PRESENT INVENTION
<SPECIFIC EXAMPLE 4>

PSNR: 25.97 [dB]
(C)

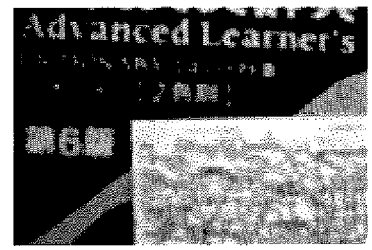

NINE-PIXEL MIXTURE OF THREE-COLOR
SYSTEM AFTER MIXTURE ACCORDING TO THE
PRESENT INVENTION
<SPECIFIC EXAMPLE 1>

PSNR: 26.28 [dB]
(D)

US 7,932,944 B2

PIXEL MIXTURE METHOD

TECHNICAL FIELD

The present invention relates to a pixel mixture method for mixing multiple pixels in a high-pixel solid-state image sensing device so as to reduce the number of image signals to be output from the high-pixel solid-state image sensing device, which is applied to an imaging device having the high-pixel solid-state image sensing device with a color filter array (CFA).

BACKGROUND TECHNIQUE

In recent years, for example, the markets expansion of imaging devices having solid-state image sensing device such as a digital still camera and a digital video camera, is remarkable. The number of the pixels of the solid-state image sensing devices (for example, the image sensing devices such as a CCD and a CMOS) used in such imaging devices, noticeably increases.

On the other hand, the technique for recording moving image at a high frame rate from the solid-state image sensing device having the very large number of the pixels (herein after also referred to simply as "high-pixel image sensing device") does not much make progress.

Therefore, in the imaging device such as a digital still camera having the high-pixel image sensing device, although the image sensing device has the very large number of the pixels, there is the problem that there is a limit in the number of the pixels (the number of the signals) which are readout as moving image.

For this reason, in the imaging device such as a digital still camera, in order to reduce the number of the pixels (the number of the signals) that are readout from the high-pixel image sensing device, a down sampling readout method and a pixel mixture method are conventionally utilized.

The down sampling readout method is a method for down sampling and reading out the pixels of the image sensing device having a CFA, simply. Further, the pixel mixture method is a method for mixing multiple pixels in an image sensing device having a CFA and reading out the mixed pixel as one pixel value (signal). At this time, for example, in pixel mixture methods disclosed in Non-Patent Document 1 and Patent Document 1 (herein after also referred to simply as "conventional methods"), the pixels having the same color in the image sensing device are mixed. Here, such conventional methods are called as "same-color-pixel mixture" or "same-color-pixel mixture method".

There are the following problems in the conventional same-color-pixel mixture methods.

For example, in the case where the conventional same-color-pixel mixture method is applied to the solid-state image sensing device having a color filter array (CFA) with Bayer pattern, since it is necessary to mix several pixels that are spatially separated, a problem that the resolution is degraded and the high-definition image cannot be obtained, occurs.

In order to solve the above problem, for example, in an imaging device disclosed in Patent document 2, a pixel mixture method for mixing four pixels that are adjacent spatially, is disclosed. However, in the case of using this pixel mixture method disclosed in Patent Document 2, there is a problem that the kind of CFA which can obtain an effective output, i.e. the high-definition image, is limited.

For example, it is impossible to apply the pixel mixture method disclosed in Patent Document 2 for Bayer pattern which is used as a color filter array (CFA) widely now. This is because in the case of applying the pixel mixture method disclosed in Patent Document 2 to the solid-state image sensing device having a CFA with Bayer pattern, the kind of the colors after mixture becomes one kind.

DISCLOSURE OF THE INVENTION

The present invention has been developed in view of the above described circumstances, and an object of the present invention is to provide a pixel mixture method for mixing multiple pixels in a high-pixel solid-state image sensing device capable of obtaining a high-definition image while reducing the number of the readout pixels in an imaging device having the high-pixel solid-state image sensing device with a color filter array (CFA).

The present invention relates to a pixel mixture method for mixing several pixels on a solid-state image sensing device, which is applied to an imaging device having said solid-state image sensing device with a color filter array (CFA) and multiple pixels. The above object of the present invention is effectively achieved by the construction that a pixel mixture operation is performed based on a pixel mixture operation equation for said several pixels that are adjacent spatially. The above object of the present invention is also effectively achieved by the construction that said pixel mixture operation is a weighting addition, i.e. an addition of results obtained by multiplying pixel value of each pixel of said several pixels by suitable pixel mixture weight corresponding to said each pixel of said several pixels, said suitable pixel mixture weight is determined based on a predetermined parameter that represents stability of a color conversion matrix computed based on said pixel mixture operation. The above object of the present invention is also effectively achieved by the construction that said predetermined parameter is a condition number of said color conversion matrix, said condition number is represented by cond (A) and is computed by the following expression:

$$cond(A) = \sqrt{\frac{\text{maximum value of } eigenvalue \text{ of } A^T A}{\text{minimum value of } eigenvalue \text{ of } A^T A}}$$

where A represents said color conversion matrix, and $A^T$ represents a transposed matrix of said color conversion matrix A, said suitable pixel mixture weight is obtained by the following Steps 1 to 5:

Step 1:
a number of pixels ((n×m) pixels (n and m are natural numbers) consisting of n pixels in a vertical direction and m pixels in a horizontal direction) to be used for said pixel mixture operation and a value of the kind L (L is an integer that is 3 or more than 3) of colors after said pixel mixture operation are determined, and initial values of (n×m×L) pixel mixture weights are determined, Step 2:
said pixel mixture operation equation is defined based on said determined values of (n×m×L) pixel mixture weights, and said color conversion matrix is generated, Step 3:
said condition number of said generated color conversion matrix is computed, Step 4:
a determination is made whether said computed condition number of said color conversion matrix is sufficiently small, said values of (n×m×L) pixel mixture weights in the case where said condition number is determined as sufficiently small are used as said suitable pixel mixture weight, on the other hand, in the case where said condition number is not determined as sufficiently small, the procedure goes to Step 5, and Step 5:

said values of (n×m×L) pixel mixture weights are changed so that said condition number of said color conversion matrix becomes small, and the procedure returns to Step 2.

Further, the above object of the present invention is also effectively achieved by the construction that a pixel mixture method characterized in that said method is applied to an imaging device having a solid-state image sensing device having a color filter array (CFA) with Bayer pattern and multiple pixels arranged two-dimensionally in a horizontal direction and a vertical direction, several pixels on said solid-state image sensing device are mixed. The above object of the present invention is also effectively achieved by the construction that said pixel mixture method comprising: a pixel mixture operating step for performing a pixel mixture operation based on a pixel mixture operation equation for said several pixels that are adjacent spatially; a color conversion matrix generating step for generating a color conversion matrix based on the kind of colors of a color space after mixture and said pixel mixture operation equation; and a desired color space converting step for converting said color space after mixture into a desired color space based on said generated color conversion matrix, wherein said pixel mixture operation is an addition of results obtained by multiplying pixel value of each pixel of said several pixels by suitable pixel mixture weight corresponding to said each pixel of said several pixels, said suitable pixel mixture weight is determined based on a condition number of said color conversion matrix, said condition number cond (A) of said color conversion matrix is computed by the following expression:

$$cond(A) = \sqrt{\frac{\text{maximum value of } eigenvalue \text{ of } A^T A}{\text{minimum value of } eigenvalue \text{ of } A^T A}}$$

where A represents said color conversion matrix, and $A^T$ represents a transposed matrix of said color conversion matrix A.

Further, the above object of the present invention is also effectively achieved by the construction that in the case where a number of pixels to be used for said pixel mixture operation is two (n=2) pixels in a vertical direction and two (m=2) pixels in a horizontal direction, and the kind of colors after said pixel mixture operation is four kinds, i.e. in a four-pixel mixture of four-color system after mixture, said pixel mixture operation equation is defined by the following expression:

$$\begin{cases} M^a_{11} = c_{11}G_{11} + c_{12}R_{12} + c_{21}B_{21} + c_{22}G_{22} \\ M^b_{12} = c_{13}G_{13} + c_{14}R_{14} + c_{23}B_{23} + c_{24}G_{24} \\ M^c_{21} = c_{31}G_{31} + c_{32}R_{32} + c_{41}B_{41} + c_{42}G_{42} \\ M^d_{22} = c_{33}G_{33} + c_{34}R_{34} + c_{43}B_{43} + c_{44}G_{44} \end{cases}$$

where, $M^a_{11}$, $M^b_{12}$, $M^c_{21}$ and $M^d_{22}$ represent color of pixel after said pixel mixture, two-digit number as subscript represents pixel position, $c_{ij}$ represents said suitable pixel mixture weight with a real value, said color conversion matrix A is defined by the following expression:

$$A = \begin{pmatrix} a_{11} & a_{12} & a_{13} \\ a_{21} & a_{22} & a_{23} \\ a_{31} & a_{32} & a_{33} \\ a_{41} & a_{42} & a_{43} \end{pmatrix}$$

where, $a_{ij}$ represents a coefficient with a real value that is obtained by said suitable pixel mixture weight $c_{ij}$, and a relationship expressed by the following expression holds between $a_{ij}$ and said suitable pixel mixture weight $c_{ij}$:

$$\begin{cases} a_{11} = c_{12} \\ a_{12} = c_{11} + c_{22} \\ a_{13} = c_{21} \\ a_{21} = c_{14} \\ a_{22} = c_{13} + c_{24} \\ a_{23} = c_{23} \\ a_{31} = c_{32} \\ a_{32} = c_{31} + c_{42} \\ a_{33} = c_{41} \\ a_{41} = c_{34} \\ a_{42} = c_{33} + c_{44} \\ a_{43} = c_{43} \end{cases}$$

said color space after mixture is converted into a RGB color space based on the following expression:

$$\begin{pmatrix} R \\ G \\ B \end{pmatrix} = (A^T A)^{-1} A^T \begin{pmatrix} M^a \\ M^b \\ M^c \\ M^d \end{pmatrix}$$

Where, $(A^T A)^{-1}$ represents an inverse matrix of $(A^T A)$.

Further, the above object of the present invention is also effectively achieved by the construction that in the case where a number of pixels to be used for said pixel mixture operation is two (n=2) pixels in a vertical direction and two (m=2) pixels in a horizontal direction, and the kind of colors after said pixel mixture operation is three kinds, i.e. in a four-pixel mixture of three-color system after mixture, said pixel mixture operation equation is defined by the following expression:

$$\begin{cases} M^a_{11} = c_{11}G_{11} + c_{12}R_{12} + c_{21}B_{21} + c_{22}G_{22} \\ M^b_{12} = c_{13}G_{13} + c_{14}R_{14} + c_{23}B_{23} + c_{24}G_{24} \\ M^c_{21} = c_{31}G_{31} + c_{32}R_{32} + c_{41}B_{41} + c_{42}G_{42} \\ M^a_{22} = c_{11}G_{33} + c_{12}R_{34} + c_{21}B_{43} + c_{22}G_{44} \end{cases}$$

where, $M^a_{11}$, $M^b_{12}$, $M^c_{21}$ and $M^a_{22}$ represent color of pixel after said pixel mixture, two-digit number as subscript represents pixel position, $c_{ij}$ represents said suitable pixel mixture weight with a real value, said color conversion matrix A is defined by the following expression:

$$A = \begin{pmatrix} a_{11} & a_{12} & a_{13} \\ a_{21} & a_{22} & a_{23} \\ a_{31} & a_{32} & a_{33} \end{pmatrix}$$

where, $a_{ij}$ represents a coefficient with a real value that is obtained by said suitable pixel mixture weight $c_{ij}$, and a relationship expressed by the following expression holds between $a_{ij}$ and said suitable pixel mixture weight $c_{ij}$:

$$\begin{cases} a_{11} = c_{12} \\ a_{12} = c_{11} + c_{22} \\ a_{13} = c_{21} \\ a_{21} = c_{14} \\ a_{22} = c_{13} + c_{24} \\ a_{23} = c_{23} \\ a_{31} = c_{32} \\ a_{32} = c_{31} + c_{42} \\ a_{33} = c_{41} \end{cases}$$

said color space after mixture is converted into a RGB color space based on the following expression:

$$\begin{pmatrix} R \\ G \\ B \end{pmatrix} = A^{-1} \begin{pmatrix} M^a \\ M^b \\ M^c \end{pmatrix}$$

Where, $A^{-1}$ represents an inverse matrix of A. The above object of the present invention is also effectively achieved by the construction that a condition number of a matrix B expressed by the following expression is used instead of said condition number cond(A) of said color conversion matrix A that is used at the time of determining said suitable pixel mixture weight $c_{ij}$:

$$B = \begin{pmatrix} a_{11} & a_{12} & a_{13} \\ a_{21} - a_{11} & a_{22} - a_{12} & a_{23} - a_{13} \\ a_{31} - a_{11} & a_{32} - a_{12} & a_{33} - a_{13} \end{pmatrix}$$

Further, the above object of the present invention is also effectively achieved by the construction that in the case where a number of pixels to be used for said pixel mixture operation is three (n=3) pixels in a vertical direction and three (m=3) pixels in a horizontal direction, and the kind of colors after said pixel mixture operation is four kinds, i.e. in a nine-pixel mixture of four-color system after mixture, said pixel mixture operation equation is defined by the following expression:

$$\begin{cases} M^a_{11} = c_{11}G_{11} + c_{12}R_{12} + c_{13}G_{13} + c_{21}B_{21} + c_{22}G_{22} + c_{23}B_{23} + c_{31}G_{31} + c_{32}R_{32} + c_{33}G_{33} \\ M^b_{12} = c_{14}R_{14} + c_{15}G_{15} + c_{16}R_{16} + c_{24}G_{24} + c_{25}B_{25} + c_{26}G_{26} + c_{34}R_{34} + c_{35}G_{35} + c_{36}R_{36} \\ M^c_{21} = c_{41}B_{41} + c_{42}G_{42} + c_{43}B_{43} + c_{51}G_{51} + c_{52}R_{52} + c_{53}G_{53} + c_{61}B_{61} + c_{62}G_{62} + c_{63}B_{63} \\ M^d_{22} = c_{44}G_{44} + c_{45}B_{45} + c_{46}G_{46} + c_{54}R_{54} + c_{55}G_{55} + c_{56}R_{56} + c_{64}G_{64} + c_{65}B_{65} + c_{66}G_{66} \end{cases}$$

where, $M^a_{11}$, $M^b_{12}$, $M^c_{21}$ and $M^d_{22}$ represent color of pixel after said pixel mixture, two-digit number as subscript represents pixel position, $c_{ij}$ represents said suitable pixel mixture weight with a real value, said color conversion matrix A is defined by the following expression:

$$A = \begin{pmatrix} a_{11} & a_{12} & a_{13} \\ a_{21} & a_{22} & a_{23} \\ a_{31} & a_{32} & a_{33} \\ a_{41} & a_{42} & a_{43} \end{pmatrix}$$

where, $a_{ij}$ represents a coefficient with a real value that is obtained by said suitable pixel mixture weight $c_{ij}$, and a relationship expressed by the following expression holds between $a_{ij}$ and said suitable pixel mixture weight $c_{ij}$:

$$\begin{cases} a_{11} = c_{12} + c_{32} \\ a_{12} = c_{11} + c_{13} + c_{22} + c_{31} + c_{33} \\ a_{13} = c_{21} + c_{23} \\ a_{21} = c_{14} + c_{16} + c_{34} + c_{36} \\ a_{22} = c_{15} + c_{24} + c_{26} + c_{35} \\ a_{23} = c_{25} \\ a_{31} = c_{52} \\ a_{32} = c_{42} + c_{51} + c_{53} + c_{62} \\ a_{33} = c_{41} + c_{43} + c_{61} + c_{63} \\ a_{41} = c_{54} + c_{56} \\ a_{42} = c_{44} + c_{46} + c_{55} + c_{64} + c_{66} \\ a_{43} = c_{45} + c_{65} \end{cases}$$

said color space after mixture is converted into a RGB color space based on the following expression:

$$\begin{pmatrix} R \\ G \\ B \end{pmatrix} = (A^T A)^{-1} A^T \begin{pmatrix} M^a \\ M^b \\ M^c \\ M^d \end{pmatrix}$$

Where, $(A^T A)^{-1}$ represents an inverse matrix of $(A^T A)$.

Further, the above object of the present invention is also effectively achieved by the construction that in the case where a number of pixels to be used for said pixel mixture operation is three (n=3) pixels in a vertical direction and three (m=3)

pixels in a horizontal direction, and the kind of colors after said pixel mixture operation is three kinds, i.e. in anine-pixel mixture of three-color system after mixture, said pixel mixture operation equation is defined by the following expression:

$$\begin{cases} M_{11}^a = c_{11}G_{11} + c_{12}R_{12} + c_{13}G_{13} + c_{21}B_{21} + c_{22}G_{22} + c_{23}B_{23} + c_{31}G_{31} + c_{32}R_{32} + c_{33}G_{33} \\ M_{12}^b = c_{14}R_{14} + c_{15}G_{15} + c_{16}R_{16} + c_{24}G_{24} + c_{25}B_{25} + c_{26}G_{26} + c_{34}R_{34} + c_{35}G_{35} + c_{36}R_{36} \\ M_{21}^c = c_{41}B_{41} + c_{42}G_{42} + c_{43}B_{43} + c_{51}G_{51} + c_{52}R_{52} + c_{53}G_{53} + c_{61}B_{61} + c_{62}G_{62} + c_{63}B_{63} \\ M_{22}^a = c_{11}G_{44} + c_{21}B_{45} + c_{13}G_{46} + c_{32}R_{54} + c_{22}G_{55} + c_{12}R_{56} + c_{31}G_{64} + c_{23}B_{65} + c_{33}G_{66} \end{cases}$$

where, $M^a_{11}$, $M^b_{12}$, $M^c_{21}$ and $M^a_{22}$ represent color of pixel after said pixel mixture, two-digit number as subscript represents pixel position, $c_{ij}$ represents said suitable pixel mixture weight with a real value, said color conversion matrix A is defined by the following expression:

$$A = \begin{pmatrix} a_{11} & a_{12} & a_{13} \\ a_{21} & a_{22} & a_{23} \\ a_{31} & a_{32} & a_{33} \end{pmatrix}$$

where, $a_{ij}$ represents a coefficient with a real value that is obtained by said suitable pixel mixture weight $c_{ij}$, and a relationship expressed by the following expression holds between $a_{ij}$ and said suitable pixel mixture weight $c_{ij}$:

$$\begin{cases} a_{11} = c_{12} + c_{32} \\ a_{12} = c_{11} + c_{13} + c_{22} + c_{31} + c_{33} \\ a_{13} = c_{21} + c_{23} \\ a_{21} = c_{14} + c_{16} + c_{34} + c_{36} \\ a_{22} = c_{15} + c_{24} + c_{26} + c_{35} \\ c_{23} = c_{25} \\ c_{31} = c_{52} \\ c_{32} = c_{42} + c_{51} + c_{53} + c_{62} \\ c_{33} = c_{41} + c_{43} + c_{61} + c_{63} \end{cases}$$

said color space after mixture is converted into a RGB color space based on the following expression:

$$\begin{pmatrix} R \\ G \\ B \end{pmatrix} = A^{-1} \begin{pmatrix} M^a \\ M^b \\ M^c \end{pmatrix}$$

Where, $A^{-1}$ represents an inverse matrix of A. The above object of the present invention is also effectively achieved by the construction that a condition number of a matrix B expressed by the following expression is used instead of said condition number cond(A) of said color conversion matrix A that is used at the time of determining said suitable pixel mixture weight $c_{ij}$:

$$B = \begin{pmatrix} a_{11} & a_{12} & a_{13} \\ a_{21} - a_{11} & a_{22} - a_{12} & a_{23} - a_{13} \\ a_{31} - a_{11} & a_{32} - a_{12} & a_{33} - a_{13} \end{pmatrix}$$

BRIEF DESCRIPTION OF THE DRAWINGS

FIG. 8 is a diagram illustrating the nine-pixel mixture result obtained by applying the pixel mixture method of the present invention, and the mixture result obtained by applying the conventional same-color pixel mixture method.

THE BEST MODE FOR CARRYING OUT THE INVENTION

Figure 1:
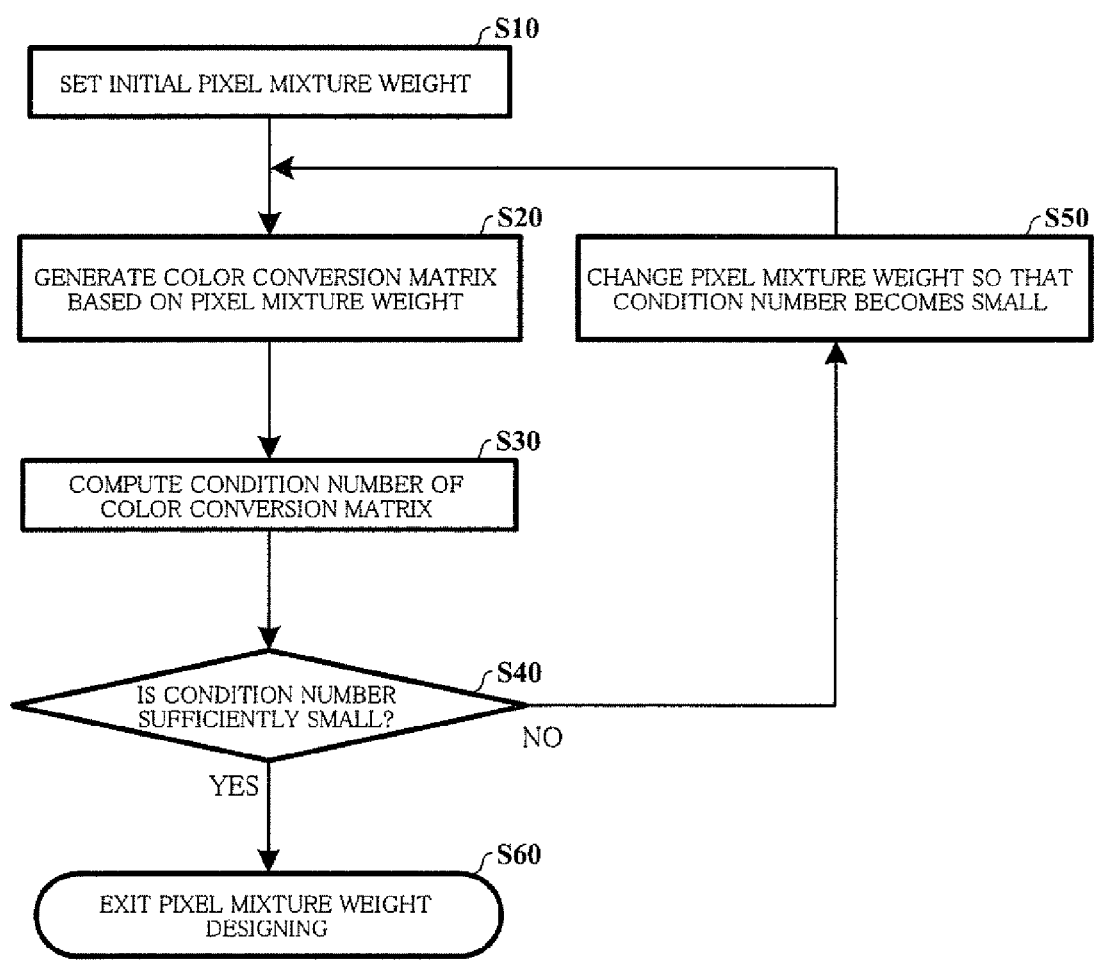
FIG. 1 is a flow chart illustrating the design procedure (the designing step) of the pixel mixture weight of the pixel mixture method according to the present invention.

The following is a description of preferred embodiments for carrying out the present invention, with reference to the accompanying drawings.

The present invention relates to a pixel mixture method for reducing the number of image signals as moving image so as to solve a problem such that there is a limit in the number of image signals as moving image which are output by a high-pixel solid-state image sensing device i.e. the number of the pixels which are readout as moving image, which is applied to an imaging device having the high-pixel solid-state image sensing device (for example, a digital camera having a CCD image sensing device with several million pixels).

That is to say, the pixel mixture method of the present invention is a pixel mixture method which is applied to an imaging device having a solid-state image sensing device having a color filter array (CFA) and multiple pixels arranged two-dimensionally in a horizontal direction and a vertical direction, and mixes predetermined multiple pixels on the solid-state image sensing device.

In a word, the greatest characteristic of the pixel mixture method according to the present invention is that in the solid-state image sensing device having a color filter array (CFA) and multiple pixels arranged two-dimensionally in a horizontal direction and a vertical direction, the pixel values of several pixels that are adjacent spatially are mixed, and then at the time of mixing the pixel values of several pixels that are adjacent spatially, a weight (i.e. a pixel mixture weight) is weighted for each of the several pixels and the weighted several pixels are mixed, i.e. the pixel mixture operation for the several pixels that are adjacent spatially is performed by weighting addition so that the high-definition moving image with satisfactory dynamic resolution can be obtained while the number of the pixels is being reduced.

In the present invention, the high-definition moving image with satisfactory dynamic resolution can be obtained by performing the pixel mixture operation based on the suitable pixel mixture weight, i.e. by suitably designing (i.e. determining) the pixel mixture weight. Further, in the present invention, a method for determining whether the pixel mixture weight is suitable or not, i.e. a computation method for obtaining the suitable pixel mixture weight is also disclosed at the same time.

In the pixel mixture method according to the present invention, the value of the kind of colors after the pixel mixture operation is performed for the spatially adjacent several pixels of the solid-state image sensing device, i.e. the value of the kind of colors after the pixel mixture operation is L (i.e. L kinds). Here, L is an integer that is 3 or more than 3.

Further, in the pixel mixture method according to the present invention, the pixels used in one pixel mixture operation is spatially adjacent (n×m) pixels consisting of n pixels in a vertical direction and m pixels in a horizontal direction on the solid-state image sensing device. Here, n and m are natural numbers.

In the pixel mixture method according to the present invention, the pixel mixture operation for the spatially adjacent pixels means an addition of results obtained by multiplying the pixel value of each pixel to be used for the pixel mixture operation by the pixel mixture weight with a real value, that is to say, the pixel mixture operation is defined by a pixel mixture operation equation, mentioned later.

In the present invention, a color conversion matrix for converting a color space before pixel mixture (for example, RGB color space) into a color space after pixel mixture (herein after also referred to simply as "a color space after mixture"), can be generated based on the pixel mixture weights. And then the condition number of the generated color conversion matrix is computed, and the optimum pixel mixture weights are designed (i.e. determined) based on the computed condition number of the color conversion matrix.

Since the image after the pixel mixture has only one-color pixel value for each pixel, the interpolation processing is carried out in the color space after the pixel mixture, so that each pixel has all pixel values of the color space after mixture.

In the present invention, the color conversion matrix is generated based on the optimum pixel mixture weights, and then the color space after mixture is converted into a desired color space (for example, RGB color space) based on the generated color conversion matrix, so that the image generated by pixel mixture can be obtained.

In addition, in the present invention, it goes without saying that not only the condition number of the color conversion matrix but also other parameters expressing stability of the color conversion matrix, can be utilized as a parameter that is used at the time of designing (determining) the pixel mixture weights.

Next, in the pixel mixture method according to the present invention, the designing method of the pixel mixture weight necessary for the pixel mixture operation (i.e. the computation method of the suitable pixel mixture weight) is described below with reference to the flow chart of FIG. 1.

At the time of applying the pixel mixture method of the present invention, the suitable pixel mixture weight necessary for the pixel mixture operation is determined (computed) through the following Steps S10 to S60.

Step S10 (Setting Initial Values of Pixel Mixture Weights):

First, the number of pixels that are used in the pixel mixture operation and the value of the kind of colors after the pixel mixture operation are determined, that is to say, first the values of n, m and L are determined, and then the initial values of (n×m×L) pixel mixture weights are determined.

Step S20 (Generating Color Conversion Matrix):

The pixel mixture operation equation is defined based on the values of (n×m×L) pixel mixture weights, and the color conversion matrix is generated.

Step S30 (Computing Condition Number of Color Conversion Matrix)

The condition number of the generated color conversion matrix is computed.

Step S40 (Determining Whether the Suitable Pixel Mixture Weights are Obtained):

The determination is made whether the computed condition number of the color conversion matrix is sufficiently small or not, in the case where the computed condition number is determined as sufficiently small, the procedure goes to Step 60. On the other hand, in the case where the computed condition number is not determined as sufficiently small, the procedure goes to Step 50.

Step S50 (Adjusting Pixel Mixture Weights):

The case where the computed condition number is not determined as sufficiently small means that the pixel mixture weights which are suitable for the pixel mixture operation are not obtained, and thus the values of (n×m×L) pixel mixture weights are changed so that the condition number of the color conversion matrix becomes small, and the procedure returns to Step 20.

Step S60 (Determining the Suitable Pixel Mixture Weights):

The case where the computed condition number is determined as sufficiently small means that the pixel mixture weights which are suitable for the pixel mixture operation are obtained, and thus the values of (n×m×L) pixel mixture weights in the case where the condition number of the color conversion matrix is determined as sufficiently small are used as the suitable pixel mixture weights.

As described above, the pixel mixture weights that are used in the pixel mixture method of the present invention, are determined (computed) based on the above Steps S10 to S60.

As mentioned above, if the pixel mixture weights are determined once, the high-definition image can be obtained based on the pixel mixture result that is obtained by applying the pixel mixture method of the present invention to the imaging device having the solid-state image sensing device with a CFA.

Hereinafter, through some specific embodiments, the pixel mixture method of the present invention is described in detail. In these embodiments, a CFA with Bayer pattern is used, but it goes without saying that the present invention is not limited to using a CFA with Bayer pattern and other CFAs can be used.

Embodiment 1 《Four-Pixel Mixture Method (Four-Color System After Mixture)》

Figure 2:
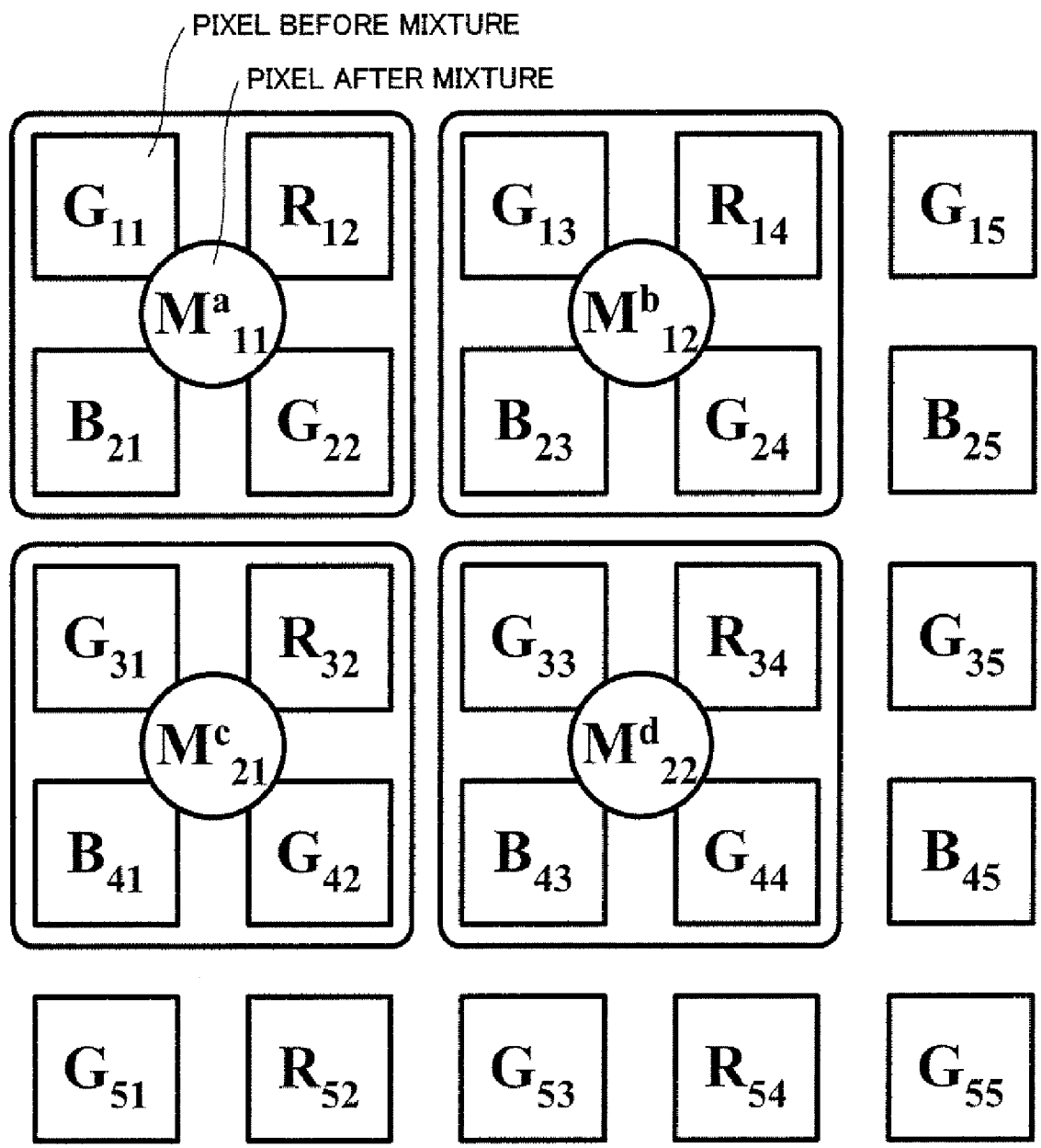
FIG. 2 is an explanatory diagram illustrating the four-pixel mixture method (n=m=2) in which the pixel mixture method of the present invention is applied to the solid-state image sensing device with Bayer pattern.

With reference to FIG. 2, the four-pixel mixture method (four-color system after mixture) in which the present invention is applied to the imaging device having the solid-state image sensing device with Bayer pattern, is described.

In FIG. 2, $M^a_{11}$, $M^b_{12}$, $M^c_{21}$ and $M^d_{22}$ represent color of pixel after the pixel mixture, two-digit number as subscript represents pixel position. "The four-pixel mixture method of four-color system after mixture" is the pixel mixture method in which different pixel mixture operations are applied to $M^a_{11}$, $M^b_{12}$, $M^c_{21}$ and $M^d_{22}$.

First, the pixel mixture operations in the four-pixel mixture method of four-color system after mixture, are defined by the following Expression 1.

$$\begin{cases} M^a_{11} = c_{11}G_{11} + c_{12}R_{12} + c_{21}B_{21} + c_{22}G_{22} \\ M^b_{12} = c_{13}G_{13} + c_{14}R_{14} + c_{23}B_{23} + c_{24}G_{24} \\ M^c_{21} = c_{31}G_{31} + c_{32}R_{32} + c_{41}B_{41} + c_{42}G_{42} \\ M^d_{22} = c_{33}G_{33} + c_{34}R_{34} + c_{43}B_{43} + c_{44}G_{44} \end{cases} \quad \text{[Expression 1]}$$

Here, the simultaneous equation expressed by the above Expression 1 is called as "pixel mixture operation equation". $c_{ij}$ is a real number which represents the pixel mixture weight. Hereinafter, $c_{ij}$ is called as the pixel mixture weight. Specifically, $c_{11}$ represents the pixel mixture weight for pixel $G_{11}$, $c_{12}$ represents the pixel mixture weight for pixel $R_{12}$, $c_{21}$ represents the pixel mixture weight for pixel $B_{21}$, $c_{22}$ represents the pixel mixture weight for pixel $G_{22}$, $c_{13}$ represents the pixel mixture weight for pixel $G_{13}$, $c_{14}$ represents the pixel mixture weight for pixel $R_{14}$, $c_{23}$ represents the pixel mixture weight for pixel $B_{23}$, $c_{24}$ represents the pixel mixture weight for pixel $G_{24}$, $c_{31}$ represents the pixel mixture weight for pixel $G_{31}$, $c_{32}$ represents the pixel mixture weight for pixel $R_{32}$, $c_{41}$ represents the pixel mixture weight for pixel $B_{41}$, $c_{42}$ represents the pixel mixture weight for pixel $G_{42}$, $c_{33}$ represents the pixel mixture weight for pixel $G_{33}$, $C_{34}$ represents the pixel mixture weight for pixel $R_{34}$, $c_{43}$ represents the pixel mixture weight for pixel $B_{43}$, and $c_{44}$ represents the pixel mixture weight for pixel $G_{44}$.

Here, with respect to the above Expression 1, an attention is paid only to the information about the colors, as a conversion of color space, a relationship expressed by the following Expression 2 is obtained.

$$\begin{pmatrix} M^a \\ M^b \\ M^c \\ M^d \end{pmatrix} = \begin{pmatrix} a_{11} & a_{12} & a_{13} \\ a_{21} & a_{22} & a_{23} \\ a_{31} & a_{32} & a_{33} \\ a_{41} & a_{42} & a_{43} \end{pmatrix} \begin{pmatrix} R \\ G \\ B \end{pmatrix} \quad \text{[Expression 2]}$$

At this time, a relationship expressed by the following Expression 3 holds between a coefficient $a_{ij}$ and the pixel mixture weight $c_{ij}$. That is to say, $a_{ij}$ is a coefficient with a real value that is obtained by the suitable pixel mixture weight $c_{ij}$.

$$\begin{cases} a_{11} = c_{12} \\ a_{12} = c_{11} + c_{22} \\ a_{13} = c_{21} \\ a_{21} = c_{14} \\ a_{22} = c_{13} + c_{24} \\ a_{23} = c_{23} \\ a_{31} = c_{32} \\ a_{32} = c_{31} + c_{42} \\ a_{33} = c_{41} \\ a_{41} = c_{34} \\ a_{42} = c_{33} + c_{44} \\ a_{43} = c_{43} \end{cases} \quad \text{[Expression 3]}$$

Here, a matrix A defined by the following Expression 4 is called as a "color conversion matrix".

$$A = \begin{pmatrix} a_{11} & a_{12} & a_{13} \\ a_{21} & a_{22} & a_{23} \\ a_{31} & a_{32} & a_{33} \\ a_{41} & a_{42} & a_{43} \end{pmatrix} \quad \text{[Expression 4]}$$

As described in the designing procedure (computation processing step) of the pixel mixture weight, the color conversion matrix A expressed by the above Expression 4 is utilized at the time of designing (computing) the pixel mixture weight $c_{ij}$. The condition number cond (A) of the color conversion matrix A is defined by the following Expression 5.

$$cond(A) = \sqrt{\frac{\text{maximum value of } eigenvalue \text{ of } A^T A}{\text{minimum value of } eigenvalue \text{ of } A^T A}} \quad \text{[Expression 5]}$$

Where, $A^T$ represents a transposed matrix of the color conversion matrix A.

As the value of the condition number cond(A) expressed by the above Expression 5 is smaller, the color conversion is more stable. The minimum value of the condition number cond (A) of the color conversion matrix A is 1.

In the case of the four-pixel mixture method of four-color system after mixture, the color space after mixture is converted into a desired color space (in this embodiment, a RGB color space) based on the following Expression 6.

$$\begin{pmatrix} R \\ G \\ B \end{pmatrix} = (A^T A)^{-1} A^T \begin{pmatrix} M^a \\ M^b \\ M^c \\ M^d \end{pmatrix} \quad \text{[Expression 6]}$$

Where, $(A^T A)^{-1}$ represents an inverse matrix of $(A^T A)$.

Embodiment 2 《Four-pixel Mixture Method (three-color System After Mixture)》

Next, the four-pixel mixture method (three-color system after mixture) in which the present invention is applied to the imaging device having the solid-state image sensing device with Bayer pattern, is described.

"The four-pixel mixture method of three-color system after mixture" is the pixel mixture method in which with respect to $M^a{}_{11}$, $M^b{}_{12}$, $M^c{}_{21}$ and $M^d{}_{22}$ shown in FIG. 2, pixel mixture operations are performed so that $M^a{}_{11}$ and $M^d{}_{22}$ or $M^b{}_{12}$ and $M^c{}_{21}$ become the same color.

The pixel mixture operations in the four-pixel mixture method of three-color system after mixture, are performed based on the pixel mixture operation equation expressed by the following Expression 7.

"The four-pixel mixture method of three-color system after mixture" according to the pixel mixture operation equation of the following Expression 7, means the pixel mixture method in which pixel mixture operations are performed so that $M^a{}_{11}$ and $M^d{}_{22}$ become the same color.

$$\begin{cases} M^a_{11} = c_{11}G_{11} + c_{12}R_{12} + c_{21}B_{21} + c_{22}G_{22} \\ M^b_{12} = c_{13}G_{13} + c_{14}R_{14} + c_{23}R_{23} + c_{24}G_{24} \\ M^c_{21} = c_{31}G_{31} + c_{32}R_{32} + c_{41}B_{41} + c_{42}G_{42} \\ M^d_{22} = c_{11}G_{33} + c_{12}R_{34} + c_{21}B_{43} + c_{22}G_{44} \end{cases} \quad \text{[Expression 7]}$$

Where, $c_{ij}$ represents the pixel mixture weight.

Here, with respect to the above Expression 7, an attention is paid only to the information about the colors, as a conversion of color space, a relationship expressed by the following Expression 8 is obtained.

$$\begin{pmatrix} M^a \\ M^b \\ M^c \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix} \quad \text{[Expression 8]}$$

At this time, a relationship expressed by the following Expression 9 holds between the coefficient $a_{ij}$ and the pixel mixture weight $c_{ij}$.

$$\begin{cases} a_{11} = c_{12} \\ a_{12} = c_{11} + c_{22} \\ a_{13} = c_{21} \\ a_{21} = c_{14} \\ a_{22} = c_{13} + c_{24} \\ a_{23} = c_{23} \\ a_{31} = c_{32} \\ a_{32} = c_{31} + c_{42} \\ a_{33} = c_{41} \end{cases} \quad \text{[Expression 9]}$$

Here, in the case of the four-pixel mixture method of three-color system after mixture, the color conversion matrix A is defined by the following Expression 10.

$$A = \begin{pmatrix} a_{11} & a_{12} & a_{13} \\ a_{21} & a_{22} & a_{23} \\ a_{31} & a_{32} & a_{33} \end{pmatrix} \quad \text{[Expression 10]}$$

The condition number cond(A) of the color conversion matrix A expressed by the above Expression 10, is utilized at the time of designing (computing) the pixel mixture weight $c_{ij}$, and is defined by the following Expression 11.

$$cond(A) = \sqrt{\frac{\text{maximum value of } eigenvalue \text{ of } A^T A}{\text{minimum value of } eigenvalue \text{ of } A^T A}} \quad \text{[Expression 11]}$$

Where, $A^T$ represents a transposed matrix of the color conversion matrix A.

Similarly to the case of the four-pixel mixture method of four-color system after mixture, as the value of the condition number cond (A) expressed by the above Expression 11 is smaller, the color conversion is more stable. The minimum value of the condition number cond(A) is 1.

In the case of the four-pixel mixture method of three-color system after mixture, the color space after mixture is converted into a RGB color space based on the following Expression 12.

$$\begin{pmatrix} R \\ G \\ B \end{pmatrix} = A^{-1} \begin{pmatrix} M^a \\ M^b \\ M^c \end{pmatrix} \quad \text{[Expression 12]}$$

Where, $A^{-1}$ represents an inverse matrix of A.

Further, in the case of the four-pixel mixture method of three-color system after mixture, the condition number of a matrix B expressed by the following Expression 13 can be used instead of the condition number cond (A) of the color conversion matrix A that is used at the time of designing (computing) the pixel mixture weight $c_{ij}$.

$$B = \begin{pmatrix} a_{11} & a_{12} & a_{13} \\ a_{21} - a_{11} & a_{22} - a_{12} & a_{23} - a_{13} \\ a_{31} - a_{11} & a_{32} - a_{12} & a_{33} - a_{13} \end{pmatrix} \quad \text{[Expression 13]}$$

Embodiment 3 (Nine-pixel Mixture Method (Four-color System after Mixture)

Figure 3:
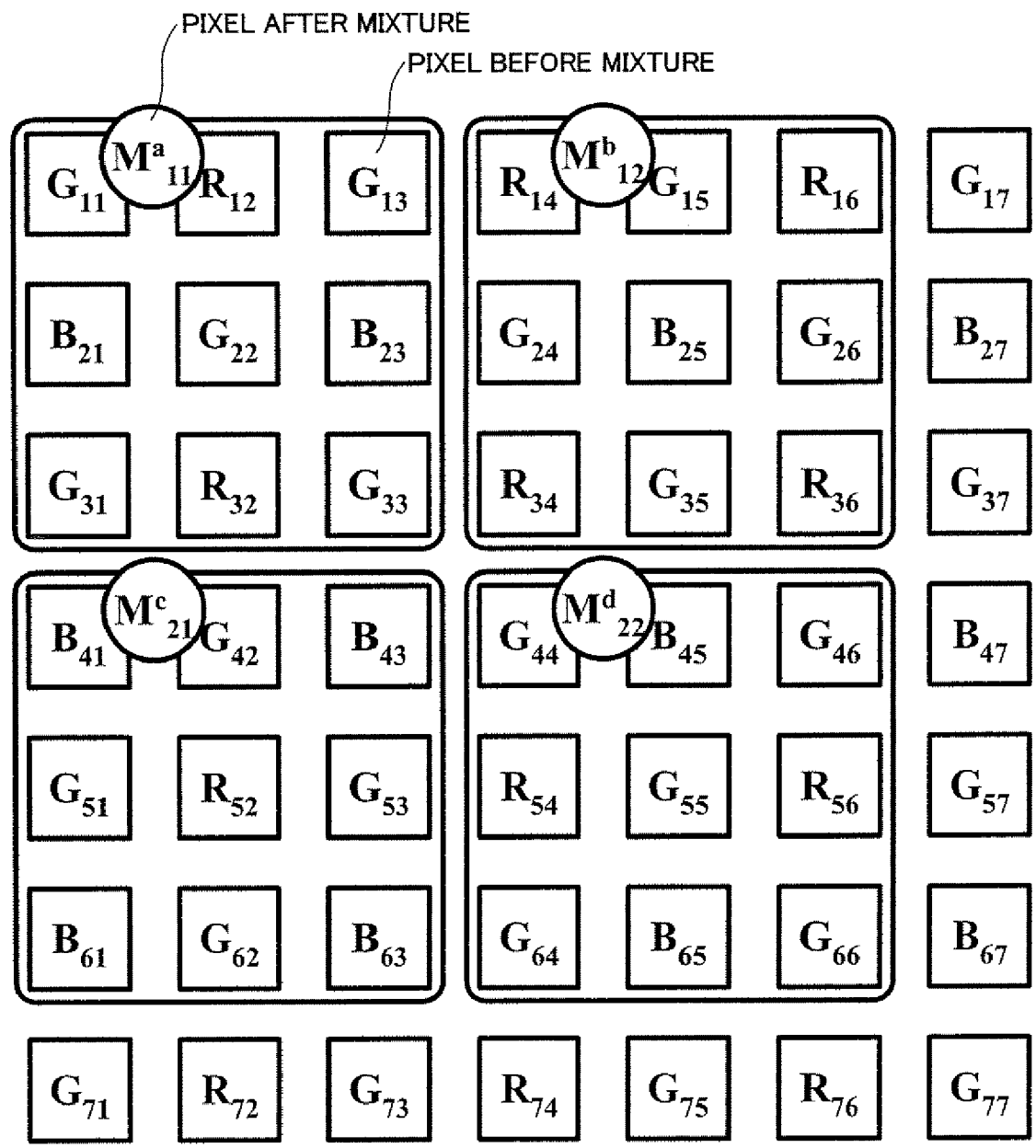
FIG. 3 is an explanatory diagram illustrating the nine-pixel mixture method (n=m=3) in which the pixel mixture method of the present invention is applied the solid-state image sensing device with Bayer pattern.

With reference to FIG. 3, the nine-pixel mixture method (four-color system after mixture) in which the present invention is applied to the imaging device having the solid-state image sensing device with Bayer pattern, is described.

In FIG. 3, $M^a{}_{11}$, $M^b{}_{12}$, $M^c{}_{21}$ and $M^d{}_{22}$ represent color of pixel after the pixel mixture, two-digit number as subscript represents pixel position. "The nine-pixel mixture method of four-color system after mixture" is the pixel mixture method in which different pixel mixture operations are applied to $M^a{}_{11}$, $M^b{}_{12}$, $M^c{}_{21}$ and $M^d{}_{22}$.

Similarly to the four-pixel mixture in which the present invention is applied, also in the case of the nine-pixel mixture in which the pixel mixture method of the present invention is applied, the pixel mixture operation equation and the color conversion matrix can be defined.

First, the pixel mixture operations in the nine-pixel mixture method of four-color system after mixture, are performed based on the pixel mixture operation equation expressed by the following Expression 14.

$$\begin{cases} M_{11}^a = c_{11}G_{11} + c_{12}R_{12} + c_{13}G_{13} + c_{21}B_{21} + c_{22}G_{22} + c_{23}B_{23} + c_{31}G_{31} + c_{32}R_{32} + c_{33}G_{33} \\ M_{12}^b = c_{14}R_{14} + c_{15}G_{15} + c_{16}R_{16} + c_{24}G_{24} + c_{25}B_{25} + c_{26}G_{26} + c_{34}R_{34} + c_{35}G_{35} + c_{36}R_{36} \\ M_{21}^c = c_{41}B_{41} + c_{42}G_{42} + c_{43}B_{43} + c_{51}G_{51} + c_{52}R_{52} + c_{53}G_{53} + c_{61}B_{61} + c_{62}G_{62} + c_{63}B_{63} \\ M_{22}^d = c_{44}G_{44} + c_{45}B_{45} + c_{46}G_{46} + c_{54}R_{54} + c_{55}G_{55} + c_{56}R_{56} + c_{64}G_{64} + c_{65}B_{65} + c_{66}G_{66} \end{cases}$$ [Expression 14]

where, $c_{ij}$ is the pixel mixture weight.

Here, with respect to the above Expression 14, an attention is paid only to the information about the colors, as a conversion of color space, a relationship expressed by the following Expression 15 is obtained.

$$\begin{pmatrix} M^a \\ M^b \\ M^c \\ M^d \end{pmatrix} = \begin{pmatrix} a_{11} & a_{12} & a_{13} \\ a_{21} & a_{22} & a_{23} \\ a_{31} & a_{32} & a_{33} \\ a_{41} & a_{42} & a_{43} \end{pmatrix} \begin{pmatrix} R \\ G \\ B \end{pmatrix}$$ [Expression 15]

At this time, a relationship expressed by the following Expression 16 holds between the coefficient $a_{ij}$ and the pixel mixture weight $c_{ij}$.

$$\begin{cases} a_{11} = c_{12} + c_{32} \\ a_{12} = c_{11} + c_{13} + c_{22} + c_{31} + c_{33} \\ a_{13} = c_{21} + c_{23} \\ a_{21} = c_{14} + c_{16} + c_{34} + c_{36} \\ a_{22} = c_{15} + c_{24} + c_{26} + c_{35} \\ a_{23} = c_{25} \\ a_{31} = c_{52} \\ a_{32} = c_{42} + c_{51} + c_{53} + c_{62} \\ a_{33} = c_{41} + c_{43} + c_{61} + c_{63} \\ a_{41} = c_{54} + c_{56} \\ a_{42} = c_{44} + c_{46} + c_{55} + c_{64} + c_{66} \\ a_{43} = c_{45} + c_{65} \end{cases}$$ [Expression 16]

Here, in the case of the nine-pixel mixture method of four-color system after mixture, the color conversion matrix A is defined by the following Expression 17.

$$A = \begin{pmatrix} a_{11} & a_{12} & a_{13} \\ a_{21} & a_{22} & a_{23} \\ a_{31} & a_{32} & a_{33} \\ a_{41} & a_{42} & a_{43} \end{pmatrix}$$ [Expression 17]

The condition number cond(A) of the color conversion matrix A expressed by the above Expression 17, is utilized at the time of designing (computing) the pixel mixture weight $c_{ij}$, and is defined by the following Expression 18.

$$cond(A) = \sqrt{\frac{\text{maximum value of } \textit{eigenvalue} \text{ of } A^T A}{\text{minimum value of } \textit{eigenvalue} \text{ of } A^T A}}$$ [Expression 18]

Where, $A^T$ represents a transposed matrix of the color conversion matrix A.

As the value of the condition number cond(A) expressed by the above Expression 18 is smaller, the color conversion is more stable. The minimum value of the condition number cond (A) is 1.

In the case of the four-pixel mixture method of nine-color system after mixture, the color space after mixture is converted into a desired color space (in this embodiment, a RGB color space) based on the following Expression 19.

$$\begin{pmatrix} R \\ G \\ B \end{pmatrix} = (A^T A)^{-1} A^T \begin{pmatrix} M^a \\ M^b \\ M^c \\ M^d \end{pmatrix}$$ [Expression 19]

Where, $(A^T A)^{-1}$ represents an inverse matrix of $(A^T A)$.

Embodiment 4 (Nine-pixel Mixture Method (Three-color System After Mixture)

Next, the nine-pixel mixture method (three-color system after mixture) in which the present invention is applied to the imaging device having the solid-state image sensing device with Bayer pattern, is described.

"The nine-pixel mixture method of three-color system after mixture" is the pixel mixture method in which with respect to $M^a{}_{11}$, $M^b{}_{12}$, $M^c{}_{21}$ and $M^d{}_{22}$ shown in FIG. 3, pixel mixture operations are performed so that $M^a{}_{11}$ and $M^d{}_{22}$ or $M^b{}_{12}$ and $M^c{}_{21}$ become the same color.

The pixel mixture operations in the nine-pixel mixture method of three-color system after mixture, are performed based on the pixel mixture operation equation expressed by the following Expression 20.

"The nine-pixel mixture method of three-color system after mixture" according to the pixel mixture operation equation of the following Expression 20, means the pixel mixture method in which pixel mixture operations are performed so that $M^a{}_{11}$ and $M^d{}_{22}$ become the same color.

$$\begin{cases} M_{11}^a = c_{11}G_{11} + c_{12}R_{12} + c_{13}G_{13} + c_{21}B_{21} + c_{22}G_{22} + c_{23}B_{23} + c_{31}G_{31} + c_{32}R_{32} + c_{33}G_{33} \\ M_{12}^b = c_{14}R_{14} + c_{15}G_{15} + c_{16}R_{16} + c_{24}G_{24} + c_{25}B_{25} + c_{26}G_{26} + c_{34}R_{34} + c_{35}G_{35} + c_{36}R_{36} \\ M_{21}^c = c_{41}B_{41} + c_{42}G_{42} + c_{43}B_{43} + c_{51}G_{51} + c_{52}R_{52} + c_{53}G_{53} + c_{61}B_{61} + c_{62}G_{62} + c_{63}B_{63} \\ M_{22}^d = c_{11}G_{44} + c_{21}B_{45} + c_{13}G_{46} + c_{32}R_{54} + c_{22}G_{55} + c_{12}R_{56} + c_{31}G_{64} + c_{23}B_{65} + c_{33}G_{66} \end{cases}$$ [Expression 20]

Where, $c_{ij}$ represents the pixel mixture weight.

Here, with respect to the above Expression 20, an attention is paid only to the information about the colors, as a conversion of color space, a relationship expressed by the following Expression 21 is obtained.

$$\begin{pmatrix} M^a \\ M^b \\ M^c \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix} \quad \text{[Expression 21]}$$

At this time, a relationship expressed by the following Expression 22 holds between the coefficient $a_{ij}$ and the pixel mixture weight $c_{ij}$.

$$\begin{cases} a_{11} = c_{12} + c_{32} \\ a_{12} = c_{11} + c_{13} + c_{22} + c_{31} + c_{33} \\ a_{13} = c_{21} + c_{23} \\ a_{21} = c_{14} + c_{16} + c_{34} + c_{36} \\ a_{22} = c_{15} + c_{24} + c_{26} + c_{35} \\ c_{23} = c_{25} \\ c_{31} = c_{52} \\ c_{32} = c_{42} + c_{51} + c_{53} + c_{62} \\ c_{33} = c_{41} + c_{43} + c_{61} + c_{63} \end{cases} \quad \text{[Expression 22]}$$

Here, in the case of the nine-pixel mixture method of three-color system after mixture, the color conversion matrix A is defined by the following Expression 23.

$$A = \begin{pmatrix} a_{11} & a_{12} & a_{13} \\ a_{21} & a_{22} & a_{23} \\ a_{31} & a_{32} & a_{33} \end{pmatrix} \quad \text{[Expression 23]}$$

The condition number cond(A) of the color conversion matrix A expressed by the above Expression 23, is utilized at the time of designing (computing) the pixel mixture weight $c_{ij}$, and is defined by the following Expression 24.

$$cond(A) = \sqrt{\frac{\text{maximum value of } eigenvalue \text{ of } A^T A}{\text{minimum value of } eigenvalue \text{ of } A^T A}} \quad \text{[Expression 24]}$$

Where, $A^T$ represents a transposed matrix of the color conversion matrix A.

Similarly to the case of the nine-pixel mixture method of four-color system after mixture, as the value of the condition number cond (A) expressed by the above Expression 24 is smaller, the color conversion is more stable. The minimum value of the condition number cond(A) is 1.

In the case of the nine-pixel mixture method of three-color system after mixture, the color space after mixture is converted into a RGB color space based on the following Expression 25.

$$\begin{pmatrix} R \\ G \\ B \end{pmatrix} = A^{-1} \begin{pmatrix} M^a \\ M^b \\ M^c \end{pmatrix} \quad \text{[Expression 25]}$$

Where, $A^{-1}$ represents an inverse matrix of A.

Further, in the case of the nine-pixel mixture method of three-color system after mixture, the condition number of a matrix B expressed by the following Expression 26 can be used instead of the condition number cond (A) of the color conversion matrix A that is used at the time of designing (computing) the pixel mixture weight $c_{ij}$.

$$B = \begin{pmatrix} a_{11} & a_{12} & a_{13} \\ a_{21} - a_{11} & a_{22} - a_{12} & a_{23} - a_{13} \\ a_{31} - a_{11} & a_{32} - a_{12} & a_{33} - a_{13} \end{pmatrix} \quad \text{[Expression 26]}$$

As mentioned above, the embodiments in which the pixel mixture method of the present invention is applied to the four-pixel mixture (n=m=2) and the nine-pixel mixture (n=m=3) are described in detail. Hereinafter, at the time of applying the pixel mixture method of the present invention to the four-pixel mixture (n=m=2) and the nine-pixel mixture (n=m=3), the specific examples of the preferred pixel mixture weights and the color conversion matrix by which the high-definition image can be obtained, are described.

First, the specific examples (in all two examples) of the preferred pixel mixture weights and the color conversion matrix in the four-pixel mixture method in which the present invention is applied to the solid-state image sensing device with Bayer pattern, are described.

⟨1-1⟩ Four-Pixel Mixture Method of Four-Color System After Mixture

Figure 4:
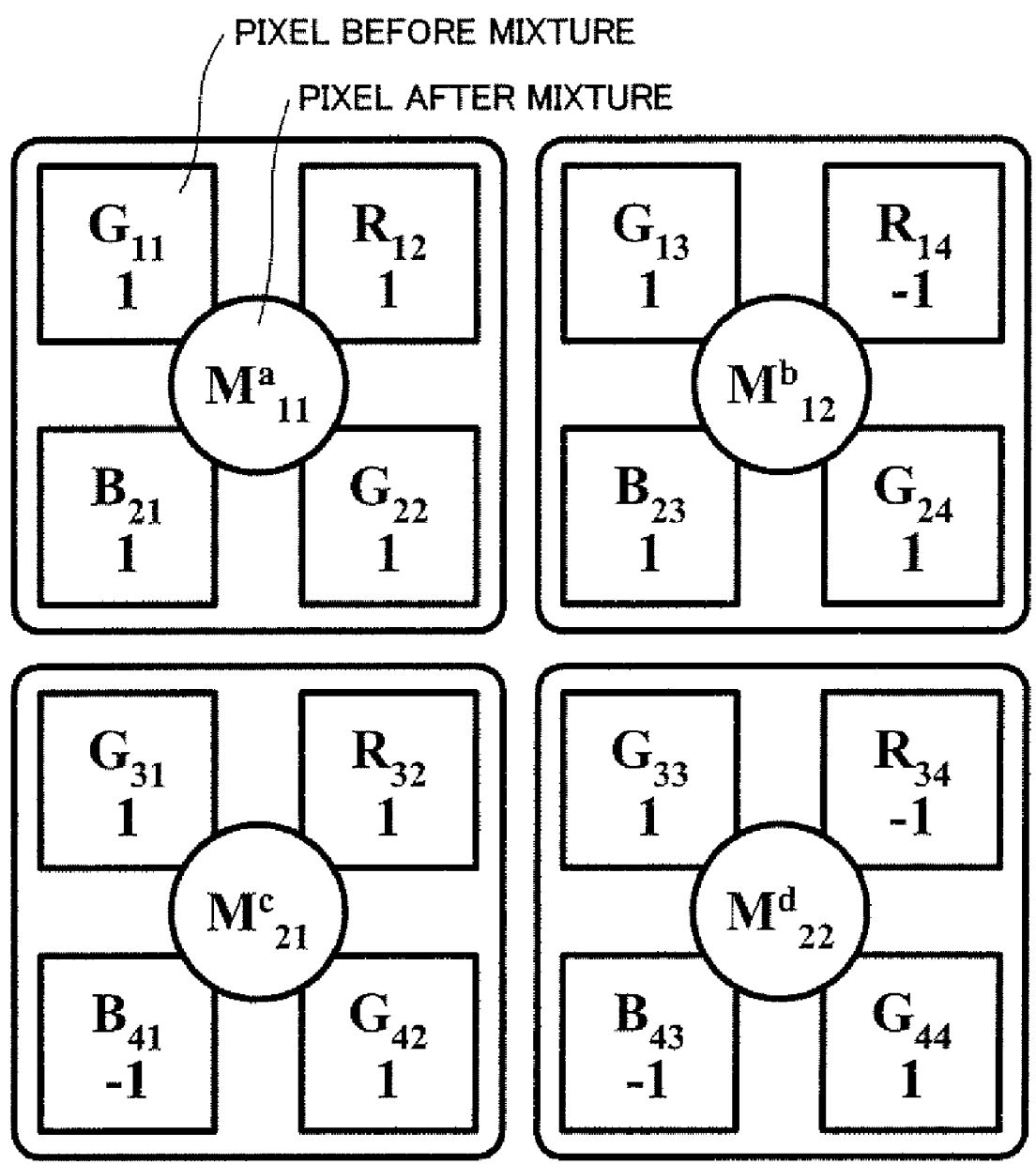
FIG. 4 is a diagram illustrating one example of the preferred pixel mixture weight in the four-pixel mixture of four-color system after mixture in which the pixel mixture method of the present invention is applied to the solid-state image sensing device with Bayer pattern.

FIG. 4 shows one example of the preferred pixel mixture weight in the four-pixel mixture of four-color system after mixture in which the pixel mixture method of the present invention is applied to the solid-state image sensing device with Bayer pattern. Characters (for example, G, R, B) of upside within the pixel before mixture that is represented by a square in FIG. 4, represents color of the pixel before mixture, and number of downside represents the pixel mixture weight corresponding to the pixel before mixture. Further, in FIG. 4, $M^a{}_{11}$, $M^b{}_{12}$, $M^c{}_{21}$ and $M^d{}_{22}$ represent color of pixel after the pixel mixture, two-digit number as subscript represents pixel position.

The pixel mixture operation equation corresponding to the pixel mixture weight shown in FIG. 4, is expressed by the following Expression 27.

$$\begin{cases} M^a_{11} = G_{11} + R_{12} + B_{21} + G_{22} \\ M^b_{12} = G_{13} - R_{14} + B_{23} + G_{24} \\ M^c_{21} = G_{31} + R_{32} - B_{41} + G_{42} \\ M^d_{22} = G_{33} - R_{34} - B_{43} + G_{44} \end{cases} \quad \text{[Expression 27]}$$

Here, the pixel mixture weight shown in FIG. 4, can also expressed by the following Expression 28.

$$\begin{aligned} &c_{11} = 1 \quad c_{12} = 1 \quad c_{21} = 1 \quad c_{22} = 1 \quad \text{[Expression 28]} \\ &c_{13} = 1 \quad c_{14} = -1 \quad c_{23} = 1 \quad c_{24} = 1 \\ &c_{31} = 1 \quad c_{32} = 1 \quad c_{41} = -1 \quad c_{42} = 1 \\ &c_{33} = 1 \quad c_{34} = -1 \quad c_{43} = -1 \quad c_{44} = 1 \end{aligned}$$

The color conversion matrix A that is generated based on the pixel mixture weight expressed by the above Expression 28, is expressed by the following Expression 29.

$$A = \begin{pmatrix} 1 & 2 & 1 \\ -1 & 2 & 1 \\ 1 & 2 & -1 \\ -1 & 2 & -1 \end{pmatrix}$$ [Expression 29]

The condition number cond(A) of the color conversion matrix A expressed by the above Expression 29 is 2.0.

⟨1-2⟩ Four-Pixel Mixture Method of Three-Color System After Mixture (in the Case where $M^a$ and $M^d$ have the Same Color)

Figure 5:
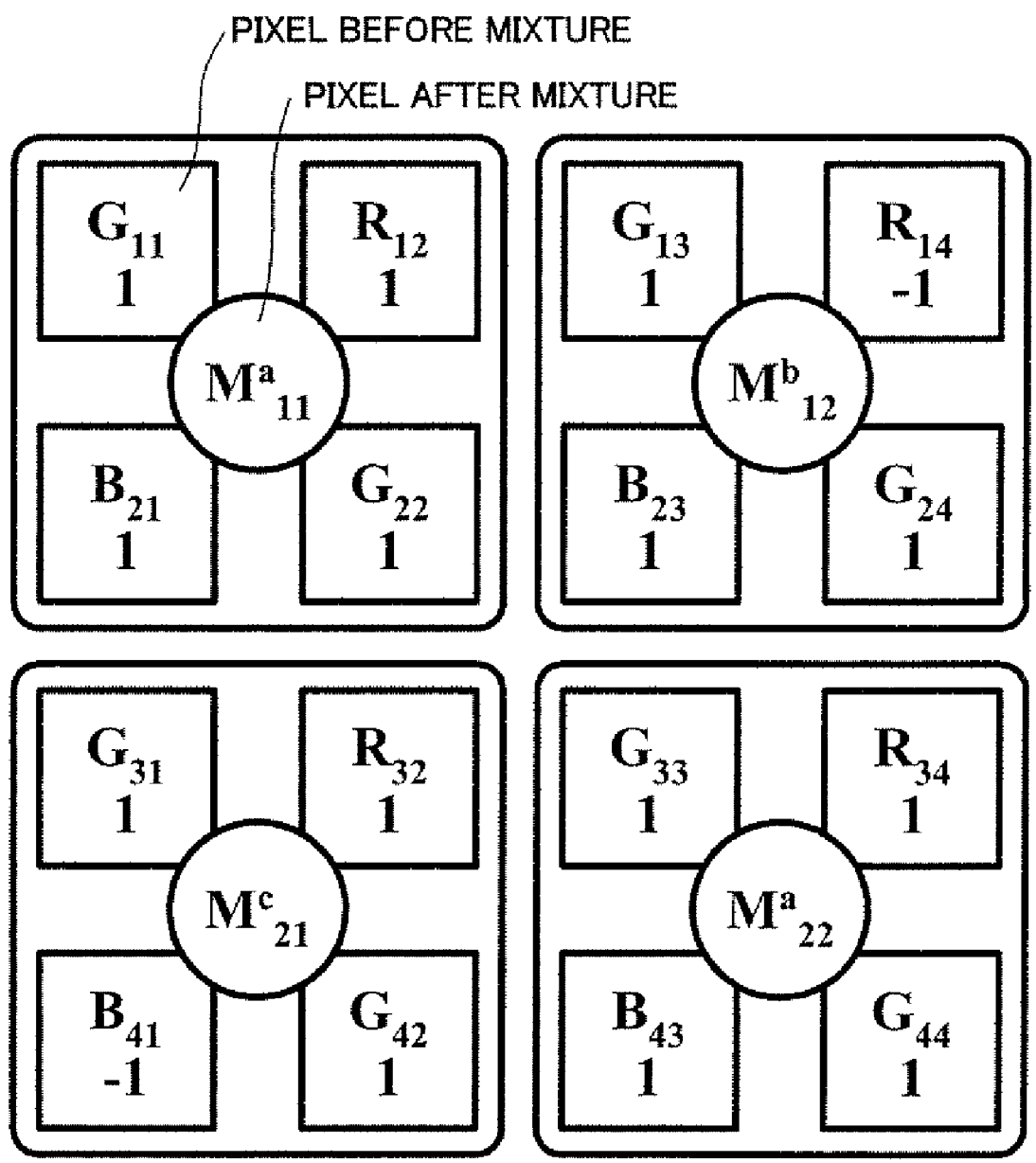
FIG. 5 is a diagram illustrating one example of the preferred pixel mixture weight in the four-pixel mixture of three-color system after mixture in which the pixel mixture method of the present invention is applied to the solid-state image sensing device with Bayer pattern.

FIG. 5 shows one example of the preferred pixel mixture weight in the four-pixel mixture of three-color system after mixture in which the pixel mixture method of the present invention is applied to the solid-state image sensing device with Bayer pattern. Characters (for example, G, R, B) of upside within the pixel before mixture that is represented by a square in FIG. 5, represents color of the pixel before mixture, and number of downside represents the pixel mixture weight corresponding to the pixel before mixture. Further, in FIG. 5, $M^a_{11}$, $M^b_{12}$, $M^c_{21}$ and $M^a_{22}$ represent color of pixel after the pixel mixture, two-digit number as subscript represents pixel position.

The pixel mixture operation equation corresponding to the pixel mixture weight shown in FIG. 5 is expressed by the following Expression 30.

$$\begin{cases} M^a_{11} = G_{11} + R_{12} + B_{21} + G_{22} \\ M^b_{12} = G_{13} - R_{14} + B_{23} + G_{24} \\ M^c_{21} = G_{31} + R_{32} - B_{41} + G_{42} \\ M^a_{22} = G_{33} + R_{34} + B_{43} + G_{44} \end{cases}$$ [Expression 30]

Here, the pixel mixture weight shown in FIG. 5, can also expressed by the following Expression 31.

$$\begin{array}{llll} c_{11} = 1 & c_{12} = 1 & c_{21} = 1 & c_{22} = 1 \\ c_{13} = 1 & c_{14} = -1 & c_{23} = 1 & c_{24} = 1 \\ c_{31} = 1 & c_{32} = 1 & c_{41} = -1 & c_{42} = 1 \end{array}$$ [Expression 31]

The color conversion matrix A that is generated based on the pixel mixture weight expressed by the above Expression 31, is expressed by the following Expression 32.

$$A = \begin{pmatrix} 1 & 2 & 1 \\ -1 & 2 & 1 \\ 1 & 2 & -1 \end{pmatrix}$$ [Expression 32]

Further, the matrix B that is generated based on the pixel mixture weight expressed by the above Expression 31, is expressed by the following Expression 33.

$$B = \begin{pmatrix} 1 & 2 & 1 \\ -2 & 0 & 0 \\ 0 & 0 & -2 \end{pmatrix}$$ [Expression 33]

The condition number of the matrix B expressed by the above Expression 33 is 2.0.

Next, the specific examples (in all five examples) of the preferred pixel mixture weights and the color conversion matrix in the nine-pixel mixture method of three-color system after mixture (in the case where $M^a$ and $M^d$ have the same color) in which the present invention is applied to the solid-state image sensing device with Bayer pattern, are described.

⟨2-1⟩ Specific Example 1

Figure 6:
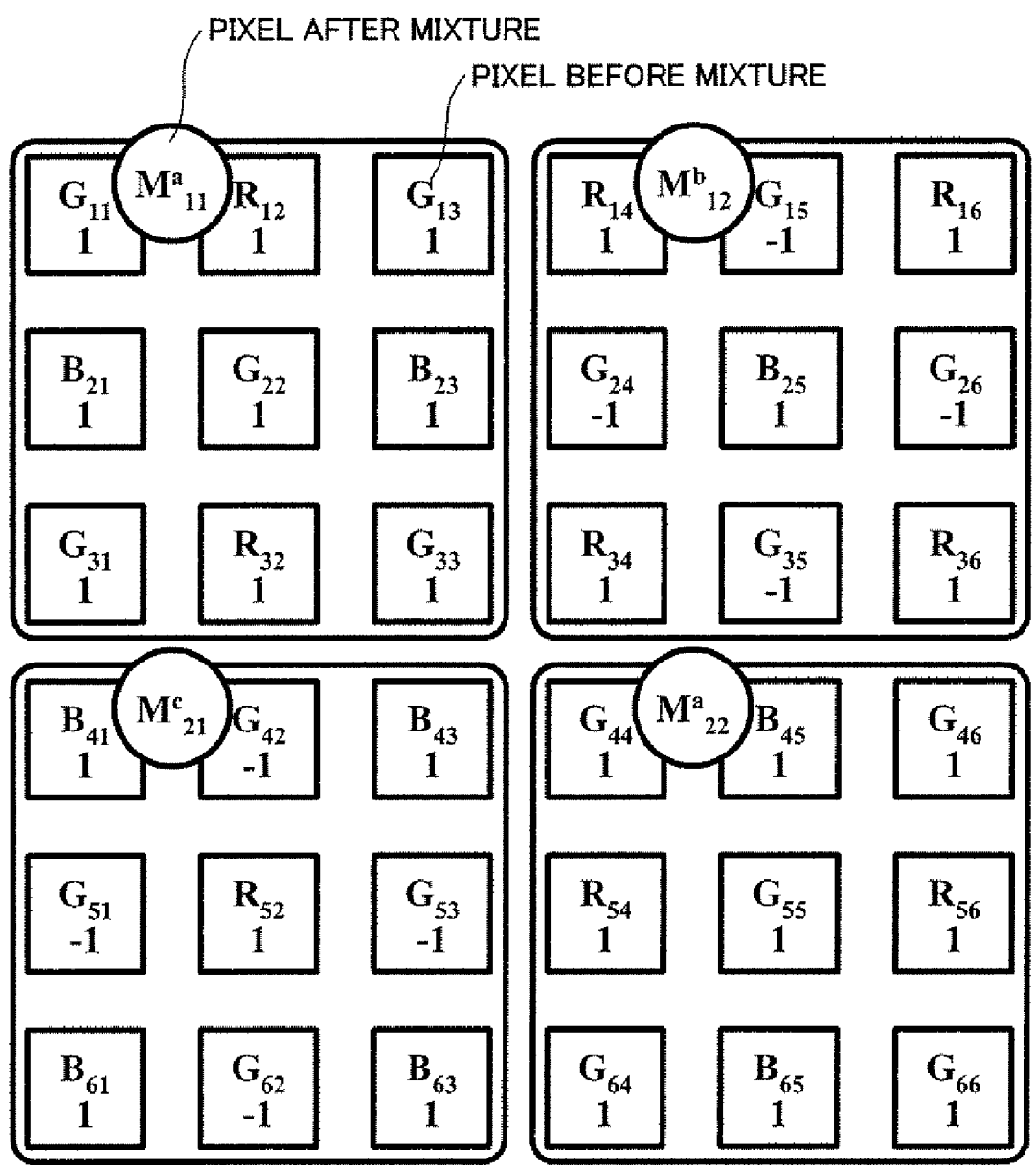
FIG. 6 is a diagram illustrating one example of the preferred pixel mixture weight in the nine-pixel mixture of three-color system after mixture in which the pixel mixture method of the present invention is applied to the solid-state image sensing device with Bayer pattern.

FIG. 6 shows one example of the preferred pixel mixture weight in the nine-pixel mixture of three-color system after mixture (in the case where $M^a$ and $M^d$ have the same color) in which the pixel mixture method of the present invention is applied to the solid-state image sensing device with Bayer pattern. Characters (for example, G, R, B) of upside within the pixel before mixture that is represented by a square in FIG. 6, represents color of the pixel before mixture, and number of downside represents the pixel mixture weight corresponding to the pixel before mixture. Further, in FIG. 6, $M^a_{11}$, $M^b_{12}$, $M^c_2$, and $M^a_{22}$ represent color of pixel after the pixel mixture, two-digit number as subscript represents pixel position.

The pixel mixture operation equation corresponding to the pixel mixture weight shown in FIG. 6 is expressed by the following Expression 34.

[Expression 34]

$$\begin{cases} M^a_{11} = G_{11} + R_{12} + G_{13} + B_{21} + G_{22} + B_{23} + G_{31} + R_{32} + G_{33} \\ M^b_{12} = R_{14} - G_{15} + R_{16} - G_{24} + B_{25} - G_{26} + R_{34} - G_{35} + R_{36} \\ M^c_{21} = B_{41} - G_{42} + B_{43} - G_{51} + R_{52} - G_{53} + B_{61} - G_{62} + B_{63} \\ M^a_{22} = G_{44} + B_{45} + G_{46} + R_{54} + G_{55} + R_{56} + G_{64} + B_{65} + G_{66} \end{cases}$$

Here, the pixel mixture weight shown in FIG. 6, can also expressed by the following Expression 35.

$$\begin{array}{lllllllll} c_{11} = 1 & c_{12} = 1 & c_{13} = 1 & c_{21} = 1 & c_{22} = 1 & c_{23} = 1 & c_{31} = 1 & c_{32} = 1 & c_{33} = 1 \\ c_{14} = 1 & c_{15} = -1 & c_{16} = 1 & c_{24} = -1 & c_{25} = 1 & c_{26} = -1 & c_{34} = 1 & c_{35} = -1 & c_{36} = 1 \\ c_{41} = 1 & c_{42} = -1 & c_{43} = 1 & c_{51} = -1 & c_{52} = 1 & c_{53} = -1 & c_{61} = 1 & c_{62} = -1 & c_{63} = 1 \end{array}$$ [Expression 35]

The color conversion matrix A that is generated based on the pixel mixture weight expressed by the above Expression 35, is expressed by the following Expression 36.

$$A = \begin{pmatrix} 2 & 5 & 2 \\ 4 & -4 & 1 \\ 1 & -4 & 4 \end{pmatrix} \quad \text{[Expression 36]}$$

The condition number cond(A) of the color conversion matrix A expressed by the above Expression 36 is 2.66.

⟨2-2⟩ Specific Example 2

The preferred pixel mixture operation equation in the nine-pixel mixture of three-color system after mixture (in the case where $M^a$ and $M^d$ have the same color) in which the pixel mixture method of the present invention is applied to the solid-state image sensing device with Bayer pattern, is defined by the following Expression 37.

[Expression 37]
$$\begin{cases} M^a_{11} = G_{11} + R_{12} + G_{13} + B_{21} + G_{22} + B_{23} + G_{31} + R_{32} + G_{33} \\ M^b_{12} = R_{14} - G_{15} + R_{16} - G_{24} - B_{25} - G_{26} + R_{34} - G_{35} + R_{36} \\ M^c_{21} = B_{41} - G_{42} + B_{43} - G_{51} + R_{52} - G_{53} + B_{61} - G_{62} + B_{63} \\ M^d_{22} = G_{44} + B_{45} + G_{46} + R_{54} + G_{55} + R_{56} + G_{64} + B_{65} + G_{66} \end{cases}$$

Here, the pixel mixture weight corresponding to the pixel mixture operation equation of the above Expression 37, can also expressed by the following Expression 38.

$c_{11} = 1 \quad c_{12} = 1 \quad c_{13} = 1 \quad c_{21} = 1 \quad c_{22} = 1 \quad c_{23} = 1 \quad c_{31} = 1 \quad c_{32} = 1 \quad c_{33} = 1$ [Expression 38]
$c_{14} = 1 \quad c_{15} = -1 \quad c_{16} = 1 \quad c_{24} = -1 \quad c_{25} = -1 \quad c_{26} = -1 \quad c_{34} = 1 \quad c_{35} = -1 \quad c_{36} = 1$
$c_{41} = 1 \quad c_{42} = -1 \quad c_{43} = 1 \quad c_{51} = -1 \quad c_{52} = 1 \quad c_{53} = -1 \quad c_{61} = 1 \quad c_{62} = -1 \quad c_{63} = 1$ The color conversion matrix A that is generated based on the pixel mixture weight expressed by the above Expression 38, is expressed by the following Expression 39.

$$A = \begin{pmatrix} 2 & 5 & 2 \\ 4 & -4 & -1 \\ 1 & -4 & 4 \end{pmatrix} \quad \text{[Expression 39]}$$

The condition number cond(A) of the color conversion matrix A expressed by the above Expression 39 is 1.93.

⟨2-3⟩ Specific Example 3

The preferred pixel mixture operation equation in the nine-pixel mixture of three-color system after mixture (in the case where Ma and $M^d$ have the same color) in which the pixel mixture method of the present invention is applied to the solid-state image sensing device with Bayer pattern, is defined by the following Expression 40.

[Expression 40]
$$\begin{cases} M^a_{11} = G_{11} + R_{12} + G_{13} + B_{21} + G_{22} + B_{23} + G_{31} + R_{32} + G_{33} \\ M^b_{12} = R_{14} - G_{15} + R_{16} - G_{24} + B_{25} - G_{26} + R_{34} - G_{35} + R_{36} \\ M^c_{21} = B_{41} - G_{42} + B_{43} - G_{51} - R_{52} - G_{53} + B_{61} - G_{62} + B_{63} \\ M^d_{22} = G_{44} + B_{45} + G_{46} + R_{54} + G_{55} + R_{56} + G_{64} + B_{65} + G_{66} \end{cases}$$

Here, the pixel mixture weight corresponding to the pixel mixture operation equation of the above Expression 40, can also expressed by the following Expression 41.

$c_{11} = 1 \quad c_{12} = 1 \quad c_{13} = 1 \quad c_{21} = 1 \quad c_{22} = 1 \quad c_{23} = 1 \quad c_{31} = 1 \quad c_{32} = 1 \quad c_{33} = 1$ [Expression 41]
$c_{14} = 1 \quad c_{15} = -1 \quad c_{16} = 1 \quad c_{24} = -1 \quad c_{25} = 1 \quad c_{26} = -1 \quad c_{34} = 1 \quad c_{35} = -1 \quad c_{36} = 1$
$c_{41} = 1 \quad c_{42} = -1 \quad c_{43} = 1 \quad c_{51} = -1 \quad c_{52} = -1 \quad c_{53} = -1 \quad c_{61} = 1 \quad c_{62} = -1 \quad c_{63} = 1$ The color conversion matrix A that is generated based on the pixel mixture weight expressed by the above Expression 41, is expressed by the following Expression 42.

$$A = \begin{pmatrix} 2 & 5 & 2 \\ 4 & -4 & 1 \\ -1 & -4 & 4 \end{pmatrix} \quad \text{[Expression 42]}$$

The condition number cond(A) of the color conversion matrix A expressed by the above Expression 42 is 1.93.

⟨2-4⟩ Specific Example 4

The preferred pixel mixture operation equation in the nine-pixel mixture of three-color system after mixture (in the case where Ma and $M^d$ have the same color) in which the pixel mixture method of the present invention is applied to the solid-state image sensing device with Bayer pattern, is defined by the following Expression 43.

[Expression 43]

$$\begin{cases} M_{11}^a = G_{11} + R_{12} + G_{13} + B_{21} + G_{22} + B_{23} + G_{31} + R_{32} + G_{33} \\ M_{12}^b = R_{14} - G_{15} + R_{16} - G_{24} - B_{25} - G_{26} + R_{34} - G_{35} + R_{36} \\ M_{21}^c = B_{41} - G_{42} + B_{43} - G_{51} - R_{52} - G_{53} + B_{61} - G_{62} + B_{63} \\ M_{22}^d = G_{44} + B_{45} + G_{46} + R_{54} + G_{55} + R_{56} + G_{64} + B_{65} + G_{66} \end{cases}$$

Here, the pixel mixture weight corresponding to the pixel mixture operation equation of the above Expression 43, can also expressed by the following Expression 44.

$c_{11} = 1 \quad c_{12} = 1 \quad c_{13} = 1 \quad c_{21} = 1 \quad c_{22} = 1 \quad c_{23} = 1 \quad c_{31} = 1 \quad c_{32} = 1 \quad c_{33} = 1$ [Expression 44]

$c_{14} = 1 \quad c_{15} = -1 \quad c_{16} = 1 \quad c_{24} = -1 \quad c_{25} = -1 \quad c_{26} = -1 \quad c_{34} = 1 \quad c_{35} = -1 \quad c_{36} = 1$ $c_{41} = 1 \quad c_{42} = -1 \quad c_{43} = 1 \quad c_{51} = -1 \quad c_{52} = -1 \quad c_{53} = -1 \quad c_{61} = 1 \quad c_{62} = -1 \quad c_{63} = 1$ The color conversion matrix A that is generated based on the pixel mixture weight expressed by the above Expression 44, is expressed by the following Expression 45.

$$A = \begin{pmatrix} 2 & 5 & 2 \\ 4 & -4 & -1 \\ -1 & -4 & 4 \end{pmatrix}$$ [Expression 45]

The condition number cond(A) of the color conversion matrix A expressed by the above Expression 45 is 1.85.

⟨2-5⟩ Specific Example 5

Figure 7:
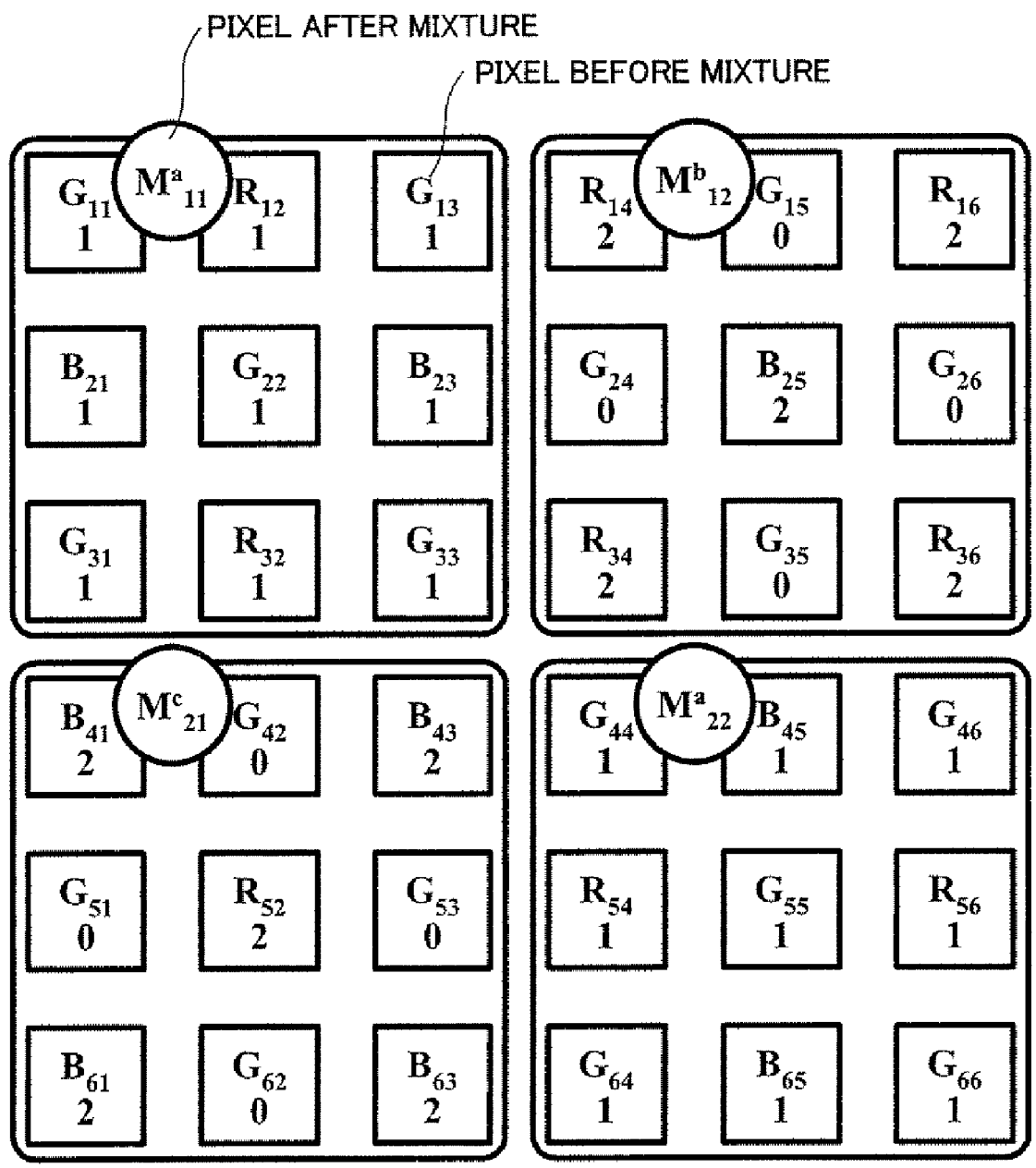
FIG. 7 is a diagram illustrating another example of the preferred pixel mixture weight in the nine-pixel mixture of three-color system after mixture in which the pixel mixture method of the present invention is applied to the solid-state image sensing device with Bayer pattern.

FIG. 7 shows one example of the preferred pixel mixture weight in the nine-pixel mixture of three-color system after mixture (in the case where Ma and $M^d$ have the same color) in which the pixel mixture method of the present invention is applied to the solid-state image sensing device with Bayer pattern. Characters (for example, G, R, B) of upside within the pixel before mixture that is represented by a square in FIG. 7, represents color of the pixel before mixture, and number of downside represents the pixel mixture weight corresponding to the pixel before mixture. Further, in FIG. 7, $M^a_{11}$, $M^b_{12}$, $M^c_{21}$ and $M^a_{22}$ represent color of pixel after the pixel mixture, two-digit number as subscript represents pixel position.

The pixel mixture operation equation corresponding to the pixel mixture weight shown in FIG. 7 is expressed by the following Expression 46.

[Expression 46]

$$\begin{cases} M_{11}^a = G_{11} + R_{12} + G_{13} + B_{21} + G_{22} + B_{23} + G_{31} + R_{32} + G_{33} \\ M_{12}^b = 2R_{14} + 2R_{16} + 2B_{25} + 2R_{34} + 2R_{36} \\ M_{21}^c = 2B_{41} + 2B_{43} + 2R_{52} + 2B_{61} + 2B_{63} \\ M_{22}^d = G_{44} + B_{45} + G_{46} + R_{54} + G_{55} + R_{56} + G_{64} + B_{65} + G_{66} \end{cases}$$

Here, the pixel mixture weight shown in FIG. 7, can also expressed by the following Expression 47.

$c_{11} = 1 \quad c_{12} = 1 \quad c_{13} = 1 \quad c_{21} = 1 \quad c_{22} = 1 \quad c_{23} = 1 \quad c_{31} = 1 \quad c_{32} = 1 \quad c_{33} = 1$ [Expression 47]

$c_{14} = 2 \quad c_{15} = 0 \quad c_{16} = 2 \quad c_{24} = 0 \quad c_{25} = 2 \quad c_{26} = 0 \quad c_{34} = 2 \quad c_{35} = 0 \quad c_{36} = 2$ $c_{41} = 2 \quad c_{42} = 0 \quad c_{43} = 2 \quad c_{51} = 0 \quad c_{52} = 2 \quad c_{53} = 0 \quad c_{61} = 2 \quad c_{62} = 0 \quad c_{63} = 2$ The color conversion matrix A that is generated based on the pixel mixture weight expressed by the above Expression 47, is expressed by the following Expression 48.

$$A = \begin{pmatrix} 2 & 5 & 2 \\ 8 & 0 & 2 \\ 2 & 0 & 8 \end{pmatrix}$$ [Expression 48]

Further, the matrix B that is generated based on the pixel mixture weight expressed by the above Expression 47, is expressed by the following Expression 49.

$$B = \begin{pmatrix} 2 & 5 & 2 \\ 6 & -5 & 0 \\ 0 & -5 & 6 \end{pmatrix}$$ [Expression 49]

The condition number of the matrix B expressed by the above Expression 49 is 1.84.

FIG. 8 shows the nine-pixel mixture result obtained by applying the pixel mixture method of the present invention, and the mixture result obtained by applying the conventional same-color pixel mixture method. In FIG. 8, with respect to the nine-pixel mixture, bicubic interpolation is used for the reconstruction of a color image. Further, since there are the conventional same-color-pixel mixture method in which pixel position after mixture is unequally-spaced and the conventional same-color-pixel mixture method in which pixel position after mixture is equally-spaced in conventional same-color-pixel mixture methods, these two methods are compared with the pixel mixture method of the present invention respectively.

Specifically, FIG. 8(A) illustrates the mixture result obtained by applying the conventional same-color-pixel mixture method in which pixel position after mixture is unequally-spaced, and FIG. 8(B) illustrates the mixture result obtained by applying the conventional same-color-pixel mixture method in which pixel position after mixture is equally-spaced.

Further, FIG. 8(C) illustrates the mixture result obtained by applying the nine-pixel mixture method of three-color system after mixture (in the case where Ma and $M^d$ have the same color) in which the pixel mixture method of the present invention is applied and which is described in ⟨2-4⟩ Specific Example 4. Then, FIG. 8(D) illustrates the mixture result obtained by applying the nine-pixel mixture method of three-color system after mixture (in the case where Ma and $M^d$ have the same color) in which the pixel mixture method of the present invention is applied and which is described in ⟨2-1⟩ Specific Example 1.

From FIG. 8, in comparison with the mixture result obtained by applying the conventional same-color-pixel mixture method, it is obvious that resolution increases even by visual observation method in mixture results obtained by applying both two nine-pixel mixture methods in which the present invention is applied. Further, in comparison with the mixture result obtained by applying the conventional same-color-pixel mixture method, since the value of PSNR of the mixture result obtained by applying the nine-pixel mixture methods of the present invention is improved, the effect such that the high-definition image can be obtained by using the pixel mixture method of the present invention is confirmed quantitatively.

INDUSTRIAL APPLICABILITY

As mentioned above, in the case where the pixel mixture method of the present invention is applied to the imaging device having the high-pixel solid-state image sensing device with a color filter array (CFA), the pixel values of several pixels that are adjacent spatially in the high-pixel solid-state image sensing device are mixed, and then at the time of mixing the pixel values of several pixels that are adjacent spatially, a suitable weight (i.e. a pixel mixture weight) is weighted for each of the several pixels and the weighted several pixels are mixed. For this reason, it is not set a limit in a kind of the color filter array (CFA), even the imaging device having the solid-state image sensing device with Bayer pattern, according to the present invention, the excellent effect such that the high-definition image can be obtained while the number of readout pixels is being reduced, can be obtained.

THE LIST OF REFERENCES

Patent Document 1:
Japanese Patent Publication No. 2005-109968
Patent Document 2:
Japanese Patent Publication No. 2003-116061
Non-Patent Document 1:

"Diagonal Pixel Mixture for CCD Image Sensors" written by Tsubaki and Aizawa, the Journal of the Institute of Image Information and Television Engineers, 2004, vol. 58, No. 3, p. 392-395.

The invention claimed is:

1. A pixel mixture method for mixing several pixels having different colors on a solid-state image sensing device, which is performed by an imaging device having said solid-state image sensing device with a color filter array (CFA) and multiple pixels,
said method characterized in that a pixel mixture operation is performed based on a pixel mixture operation equation for said several pixels that are adjacent spatially using the imaging device,
said pixel mixture is a weighting addition, i.e. an addition of results obtained by multiplying pixel value of each pixel of said several pixels by suitable pixel mixture weight corresponding to said each pixel of said several pixels, and
said suitable pixel mixture weight is determined based on a predetermined parameter that is computed based on eigenvalues of $A^T A$,
where A represents a color conversion matrix computed based on pixel mixture weights, $A^T$ represents a transposed matrix of said color conversion matrix A, and the kind L of colors after said pixel mixture operation is an integer that is 3 or more than 3.

2. The pixel mixture method according to claim 1, wherein said predetermined parameter is a condition number of said color conversion matrix,
said condition number is represented by cond(A) and is computed by the following expression:

$$cond(A) = \sqrt{\frac{\text{maximum value of } eigenvalue \text{ of } A^T A}{\text{minimum value of } eigenvalue \text{ of } A^T A}}$$

said suitable pixel mixture weight is obtained by the following Steps 1 to 5:
Step 1:
a number of pixels ((n×m) pixels (n and m are natural numbers) consisting of n pixels in a vertical direction and m pixels in a horizontal direction) to be used for said pixel mixture operation and a value of said kind L are determined, and initial values of (n×m×L) pixel mixture weights are determined,
Step 2:
said pixel mixture operation equation is defined based on said determined values of (n×m×L) pixel mixture weights, and said color conversion matrix is generated,
Step 3:
said condition number of said generated color conversion matrix is computed,
Step 4:
a determination is made whether said computed condition number of said color conversion matrix is sufficiently small, said values of (n×m×L) pixel mixture weights in the case where said condition number is determined as sufficiently small are used as said suitable pixel mixture weight, on the other hand, in the case where said condition number is not determined as sufficiently small, the procedure goes to Step 5, and Step 5:
   said values of (n×m×L) pixel mixture weights are changed so that said condition number of said color conversion matrix becomes small, and the procedure returns to Step 2.

3. A pixel mixture method characterized in that said method is performed by an imaging device having a solid-state image sensing device having a color filter array (CFA) with Bayer pattern and multiple pixels arranged two-dimensionally in a horizontal direction and a vertical direction, several pixels having different colors on said solid-state image sensing device are mixed, said method comprising:
   a pixel mixture operating step for performing a pixel mixture operation based on a pixel mixture operation equation for said several pixels that are adjacent spatially using the imaging device;
   a color conversion matrix generating step for generating a color conversion matrix based on the kind of colors of a color space after mixture and said pixel mixture operation equation; and
   a desired color space converting step for converting said color space after mixture into a desired color space based on said generated color conversion matrix,
   wherein said pixel mixture operation is an addition of results obtained by multiplying pixel value of each pixel of said several pixels by suitable pixel mixture weight corresponding to said each pixel of said several pixels, said suitable pixel mixture weight is determined based on a condition number of said color conversion matrix,
   said condition number cond(A) of said color conversion matrix is computed by the following expression:

$$cond(A) = \sqrt{\frac{\text{maximum value of eigenvalue of } A^T A}{\text{minimum value of eigenvalue of } A^T A}}$$

where A represents said color conversion matrix, and $A^T$ represents a transposed matrix of said color conversion matrix A.

4. The pixel mixture method according to claim 3, wherein in the case where a number of pixels to be used for said pixel mixture operation is two (n=2) pixels in a vertical direction and two (m=2) pixels in a horizontal direction, and the kind of colors after said pixel mixture operation is four kinds, i.e. in a four-pixel mixture of four-color system after mixture,
   said pixel mixture operation equation is defined by the following expression:

$$\begin{cases} M^a_{11} = c_{11}G_{11} + c_{12}R_{12} + c_{21}B_{21} + c_{22}G_{22} \\ M^b_{12} = c_{13}G_{13} + c_{14}R_{14} + c_{23}B_{23} + c_{24}G_{24} \\ M^c_{21} = c_{31}G_{31} + c_{32}R_{32} + c_{41}B_{41} + c_{42}G_{42} \\ M^d_{22} = c_{33}G_{33} + c_{34}R_{34} + c_{43}B_{43} + c_{44}G_{44} \end{cases}$$

where, $M^a_{11}$, $M^b_{12}$, $M^c_{21}$ and $M^d_{22}$ represent color of pixel after said pixel mixture, two-digit number as subscript represents pixel position, $c_{ij}$ represents said suitable pixel mixture weight with a real value, said color conversion matrix A is defined by the following expression:

$$A = \begin{pmatrix} a_{11} & a_{12} & a_{13} \\ a_{21} & a_{22} & a_{23} \\ a_{31} & a_{32} & a_{33} \\ a_{41} & a_{42} & a_{43} \end{pmatrix}$$

where, $a_{ij}$ represents a coefficient with a real value that is obtained by said suitable pixel mixture weight $c_{ij}$, and a relationship expressed by the following expression holds between $a_{ij}$ and said suitable pixel mixture weight $c_{ij}$:

$$\begin{cases} a_{11} = c_{12} \\ a_{12} = c_{11} + c_{22} \\ a_{13} = c_{21} \\ a_{21} = c_{14} \\ a_{22} = c_{13} + c_{24} \\ a_{23} = c_{23} \\ a_{31} = c_{32} \\ a_{32} = c_{31} + c_{42} \\ a_{33} = c_{41} \\ a_{41} = c_{34} \\ a_{42} = c_{33} + c_{44} \\ a_{43} = c_{43} \end{cases}$$

said color space after mixture is converted into a RGB color space based on the following expression:

$$\begin{pmatrix} R \\ G \\ B \end{pmatrix} = (A^T A)^{-1} A^T \begin{pmatrix} M^a \\ M^b \\ M^c \\ M^d \end{pmatrix}$$

Where, $(A^T A)^{-1}$ represents an inverse matrix of $(A^T A)$.

5. The pixel mixture method according to claim 4, wherein said suitable pixel mixture weight has values expressed by the following expression:

$$\begin{matrix} c_{11} = 1 & c_{12} = 1 & c_{21} = 1 & c_{22} = 1 \\ c_{13} = 1 & c_{14} = -1 & c_{23} = 1 & c_{24} = 1 \\ c_{31} = 1 & c_{32} = 1 & c_{41} = -1 & c_{42} = 1 \\ c_{33} = 1 & c_{34} = -1 & c_{43} = -1 & c_{44} = 1 \end{matrix}.$$

6. The pixel mixture method according to claim 3, wherein in the case where a number of pixels to be used for said pixel mixture operation is two (n=2) pixels in a vertical direction and two (m=2) pixels in a horizontal direction, and the kind of colors after said pixel mixture operation is three kinds, i.e. in a four-pixel mixture of three-color system after mixture, said pixel mixture operation equation is defined by the following expression:

$$\begin{cases} M_{11}^a = c_{11}G_{11} + c_{12}R_{12} + c_{21}B_{21} + c_{22}G_{22} \\ M_{12}^b = c_{13}G_{13} + c_{14}R_{14} + c_{23}B_{23} + c_{24}G_{24} \\ M_{21}^c = c_{31}G_{31} + c_{32}R_{32} + c_{41}B_{41} + c_{42}G_{42} \\ M_{22}^a = c_{11}G_{33} + c_{12}R_{34} + c_{21}B_{43} + c_{22}G_{44} \end{cases}$$

where, $M^a_{11}$, $M^b_{12}$, $M^c_{21}$ and $M^a_{22}$ represent color of pixel after said pixel mixture, two-digit number as subscript represents pixel position, $c_{ij}$ represents said suitable pixel mixture weight with a real value, said color conversion matrix A is defined by the following expression:

$$A = \begin{pmatrix} a_{11} & a_{12} & a_{13} \\ a_{21} & a_{22} & a_{23} \\ a_{31} & a_{32} & a_{33} \end{pmatrix}$$

where, $a_{ij}$ represents a coefficient with a real value that is obtained by said suitable pixel mixture weight $c_{ij}$, and a relationship expressed by the following expression holds between $a_{ij}$ and said suitable pixel mixture weight $c_{ij}$:

$$\begin{cases} a_{11} = c_{12} \\ a_{12} = c_{11} + c_{22} \\ a_{13} = c_{21} \\ a_{21} = c_{14} \\ a_{22} = c_{13} + c_{24} \\ a_{23} = c_{23} \\ a_{31} = c_{32} \\ a_{32} = c_{31} + c_{42} \\ a_{33} = c_{41} \end{cases}$$

said color space after mixture is converted into a RGB color space based on the following expression:

$$\begin{pmatrix} R \\ G \\ B \end{pmatrix} = A^{-1} \begin{pmatrix} M^a \\ M^b \\ M^c \end{pmatrix}$$

Where, $A^{-1}$ represents an inverse matrix of A.

7. The pixel mixture method according to claim 6, wherein said suitable pixel mixture weight has values expressed by the following expression:

$$\begin{aligned} c_{11} &= 1 & c_{12} &= 1 & c_{21} &= 1 & c_{22} &= 1 \\ c_{13} &= 1 & c_{14} &= -1 & c_{23} &= 1 & c_{24} &= 1 \\ c_{31} &= 1 & c_{32} &= 1 & c_{41} &= -1 & c_{42} &= 1 \end{aligned}$$

8. The pixel mixture method according to claim 6, wherein a condition number of a matrix B expressed by the following expression is used instead of said condition number cond(A) of said color conversion matrix A that is used at the time of determining said suitable pixel mixture weight $c_{ij}$:

$$B = \begin{pmatrix} a_{11} & a_{12} & a_{13} \\ a_{21} - a_{11} & a_{22} - a_{12} & a_{23} - a_{13} \\ a_{31} - a_{11} & a_{32} - a_{12} & a_{33} - a_{13} \end{pmatrix}$$

9. The pixel mixture method according to claim 3, wherein in the case where a number of pixels to be used for said pixel mixture operation is three (n=3) pixels in a vertical direction and three (m=3) pixels in a horizontal direction, and the kind of colors after said pixel mixture operation is four kinds, i.e. in a nine-pixel mixture of four-color system after mixture, said pixel mixture operation equation is defined by the following expression:

$$\begin{cases} M_{11}^a = c_{11}G_{11} + c_{12}R_{12} + c_{13}G_{13} + c_{21}B_{21} + c_{22}G_{22} + c_{23}B_{23} + c_{31}G_{31} + c_{32}R_{32} + C_{33}G_{33} \\ M_{12}^b = c_{14}R_{14} + c_{15}G_{15} + c_{16}R_{16} + c_{24}G_{24} + c_{25}B_{25} + c_{26}G_{26} + c_{34}R_{34} + c_{35}G_{35} + c_{36}R_{36} \\ M_{21}^c = c_{41}B_{41} + c_{42}G_{42} + c_{43}B_{43} + c_{51}G_{51} + c_{52}R_{52} + c_{53}G_{53} + c_{61}B_{61} + c_{62}G_{62} + c_{63}B_{63} \\ M_{22}^d = c_{44}G_{44} + c_{45}B_{45} + c_{46}G_{46} + c_{54}R_{54} + c_{55}G_{55} + c_{56}R_{56} + c_{64}G_{64} + c_{65}B_{65} + c_{66}G_{66} \end{cases}$$

where, $M^a_{11}$, $M^b_{12}$, $M^c_{21}$ and $M^d_{22}$ represent color of pixel after said pixel mixture, two-digit number as subscript represents pixel position, $c_{ij}$ represents said suitable pixel mixture weight with a real value, said color conversion matrix A is defined by the following expression:

$$A = \begin{pmatrix} a_{11} & a_{12} & a_{13} \\ a_{21} & a_{22} & a_{23} \\ a_{31} & a_{32} & a_{33} \\ a_{41} & a_{42} & a_{43} \end{pmatrix}$$

where, $a_{ij}$ represents a coefficient with a real value that is obtained by said suitable pixel mixture weight $c_{ij}$, and a relationship expressed by the following expression holds between $a_{ij}$ and said suitable pixel mixture weight $c_{ij}$:

$$\begin{cases} a_{11} = c_{12} + c_{32} \\ a_{12} = c_{11} + c_{13} + c_{22} + c_{31} + c_{33} \\ a_{13} = c_{21} + c_{23} \\ a_{21} = c_{14} + c_{16} + c_{34} + c_{36} \\ a_{22} = a_{15} + c_{24} + c_{26} + c_{35} \\ a_{23} = c_{25} \\ a_{31} = c_{52} \\ a_{32} = c_{42} + c_{51} + c_{53} + c_{62} \\ a_{33} = c_{41} + c_{43} + c_{61} + c_{63} \\ a_{41} = c_{54} + c_{56} \\ a_{42} = c_{44} + c_{46} + c_{55} + c_{64} + c_{66} \\ a_{43} = c_{45} + c_{65} \end{cases}$$

said color space after mixture is converted into a RGB color space based on the following expression:

$$\begin{pmatrix} R \\ G \\ B \end{pmatrix} = (A^T A)^{-1} A^T \begin{pmatrix} M^a \\ M^b \\ M^c \\ M^d \end{pmatrix}$$

Where, $(A^T A)^{-1}$ represents an inverse matrix of $(A^T A)$.

10. The pixel mixture method according to claim 3, wherein
in the case where a number of pixels to be used for said pixel mixture operation is three (n=3) pixels in a vertical direction and three (m=3) pixels in a horizontal direction, and the kind of colors after said pixel mixture operation is three kinds, i.e. in a nine-pixel mixture of three-color system after mixture,
said pixel mixture operation equation is defined by the following expression:

$$\begin{cases} M^a_{11} = c_{11}G_{11} + c_{12}R_{12} + c_{13}G_{13} + c_{21}B_{21} + c_{22}G_{22} + c_{23}B_{23} + c_{31}G_{31} + c_{32}R_{32} + c_{33}G_{33} \\ M^b_{12} = c_{14}R_{14} + c_{15}G_{15} + c_{16}R_{16} + c_{24}G_{24} + c_{25}B_{25} + c_{26}G_{26} + c_{34}R_{34} + c_{35}G_{35} + c_{36}R_{36} \\ M^c_{21} = c_{41}B_{41} + c_{42}G_{42} + c_{43}B_{43} + c_{51}G_{51} + c_{52}R_{52} + c_{53}G_{53} + c_{61}B_{61} + c_{62}G_{62} + c_{63}B_{63} \\ M^a_{22} = c_{11}G_{44} + c_{21}B_{45} + c_{13}G_{46} + c_{32}R_{54} + c_{22}G_{55} + c_{12}R_{56} + c_{31}G_{64} + c_{23}B_{65} + c_{33}G_{66} \end{cases}$$

where, $M^a_{11}, M^b_{12}, M^c_{21}$ and $M^a_{22}$ represent color of pixel after said pixel mixture, two-digit number as subscript represents pixel position, $c_{ij}$ represents said suitable pixel mixture weight with a real value,
said color conversion matrix A is defined by the following expression:

$$A = \begin{pmatrix} a_{11} & a_{12} & a_{13} \\ a_{21} & a_{22} & a_{23} \\ a_{31} & a_{32} & a_{33} \end{pmatrix}$$

where, $a_{ij}$ represents a coefficient with a real value that is obtained by said suitable pixel mixture weight $c_{ij}$, and a relationship expressed by the following expression holds between $a_{ij}$ and said suitable pixel mixture weight $c_{ij}$:

$$\begin{cases} a_{11} = c_{12} + c_{32} \\ a_{12} = c_{11} + c_{13} + c_{22} + c_{31} + c_{33} \\ a_{13} = c_{21} + c_{23} \\ a_{21} = c_{14} + c_{16} + c_{34} + c_{36} \\ a_{22} = c_{15} + c_{24} + c_{26} + c_{35} \\ c_{23} = c_{25} \\ c_{31} = c_{52} \\ c_{32} = c_{42} + c_{51} + c_{53} + c_{62} \\ c_{33} = c_{41} + c_{43} + c_{61} + c_{63} \end{cases}$$

said color space after mixture is converted into a RGB color space based on the following expression:

$$\begin{pmatrix} R \\ G \\ B \end{pmatrix} = A^{-1} \begin{pmatrix} M^a \\ M^b \\ M^c \end{pmatrix}$$

Where, $A^{-1}$ represents an inverse matrix of A.

11. The pixel mixture method according to claim 10, wherein said suitable pixel mixture weight has any one of following five values expressed by the following five mathematical formulas.

$c_{11} = 1$ $c_{12} = 1$ $c_{13} = 1$ $c_{21} = 1$ $c_{22} = 1$ $c_{23} = 1$ $c_{31} = 1$ $c_{32} = 1$ $c_{33} = 1$ Mathematical Formula 1
$c_{14} = 1$ $c_{15} = -1$ $c_{16} = 1$ $c_{24} = -1$ $c_{25} = 1$ $c_{26} = -1$ $c_{34} = 1$ $c_{35} = -1$ $c_{36} = 1$
$c_{41} = 1$ $c_{42} = -1$ $c_{43} = 1$ $c_{51} = -1$ $c_{52} = 1$ $c_{53} = -1$ $c_{61} = 1$ $c_{62} = -1$ $c_{63} = 1$ $c_{11} = 1$ $c_{12} = 1$ $c_{13} = 1$ $c_{21} = 1$ $c_{22} = 1$ $c_{23} = 1$ $c_{31} = 1$ $c_{32} = 1$ $c_{33} = 1$ Mathematical Formula 2
$c_{14} = 1$ $c_{15} = -1$ $c_{16} = 1$ $c_{24} = -1$ $c_{25} = -1$ $c_{26} = -1$ $c_{34} = 1$ $c_{35} = -1$ $c_{36} = 1$
$c_{41} = 1$ $c_{42} = -1$ $c_{43} = 1$ $c_{51} = -1$ $c_{52} = 1$ $c_{53} = -1$ $c_{61} = 1$ $c_{62} = -1$ $c_{63} = 1$ $c_{11} = 1$ $c_{12} = 1$ $c_{13} = 1$ $c_{21} = 1$ $c_{22} = 1$ $c_{23} = 1$ $c_{31} = 1$ $c_{32} = 1$ $c_{33} = 1$ Mathematical Formula 3
$c_{14} = 1$ $c_{15} = -1$ $c_{16} = 1$ $c_{24} = -1$ $c_{25} = 1$ $c_{26} = -1$ $c_{34} = 1$ $c_{35} = -1$ $c_{36} = 1$
$c_{41} = 1$ $c_{42} = -1$ $c_{43} = 1$ $c_{51} = -1$ $c_{52} = -1$ $c_{53} = -1$ $c_{61} = 1$ $c_{62} = -1$ $c_{63} = 1$ $c_{11} = 1$ $c_{12} = 1$ $c_{13} = 1$ $c_{21} = 1$ $c_{22} = 1$ $c_{23} = 1$ $c_{31} = 1$ $c_{32} = 1$ $c_{33} = 1$ Mathematical Formula 4
$c_{14} = 1$ $c_{15} = -1$ $c_{16} = 1$ $c_{24} = -1$ $c_{25} = -1$ $c_{26} = -1$ $c_{34} = 1$ $c_{35} = -1$ $c_{36} = 1$
$c_{41} = 1$ $c_{42} = -1$ $c_{43} = 1$ $c_{51} = -1$ $c_{52} = -1$ $c_{53} = -1$ $c_{61} = 1$ $c_{62} = -1$ $c_{63} = 1$ $c_{11} = 1$ $c_{12} = 1$ $c_{13} = 1$ $c_{21} = 1$ $c_{22} = 1$ $c_{23} = 1$ $c_{31} = 1$ $c_{32} = 1$ $c_{33} = 1$ Mathematical Formula 5
$c_{14} = 2$ $c_{15} = 0$ $c_{16} = 2$ $c_{24} = 0$ $c_{25} = 2$ $c_{26} = 0$ $c_{34} = 2$ $c_{35} = 0$ $c_{36} = 2$
$c_{41} = 2$ $c_{42} = 0$ $c_{43} = 2$ $c_{51} = 0$ $c_{52} = 2$ $c_{53} = 0$ $c_{61} = 2$ $c_{62} = 0$ $c_{63} = 2.$

12. The pixel mixture method according to claim 10, wherein a condition number of a matrix B expressed by the following expression is used instead of said condition number cond(A) of said color conversion matrix A that is used at the time of determining said suitable pixel mixture weight $c_{ij}$:

$$B = \begin{pmatrix} a_{11} & a_{12} & a_{13} \\ a_{21} - a_{11} & a_{22} - a_{12} & a_{23} - a_{13} \\ a_{31} - a_{11} & a_{32} - a_{12} & a_{33} - a_{13} \end{pmatrix}.$$

* * * * *